US008612270B2

(12) United States Patent
Hazy

(10) Patent No.: US 8,612,270 B2
(45) Date of Patent: Dec. 17, 2013

(54) SYSTEM AND METHOD TO SIMULATE THE IMPACT OF LEADERSHIP ACTIVITY

(76) Inventor: James K. Hazy, Lebanon, NJ (US)

(*) Notice: Subject to any disclaimer, the term of this patent is extended or adjusted under 35 U.S.C. 154(b) by 1860 days.

(21) Appl. No.: 11/570,136

(22) PCT Filed: Jun. 8, 2005

(86) PCT No.: PCT/US2005/019921
§ 371 (c)(1),
(2), (4) Date: Dec. 7, 2006

(87) PCT Pub. No.: WO2005/124625
PCT Pub. Date: Dec. 29, 2005

(65) Prior Publication Data
US 2007/0250361 A1    Oct. 25, 2007

Related U.S. Application Data

(60) Provisional application No. 60/578,999, filed on Jun. 12, 2004.

(51) Int. Cl.
    *G06Q 10/00* (2012.01)
(52) U.S. Cl.
    USPC ......................................................... 705/7.11
(58) Field of Classification Search
    USPC ..................................... 705/7, 7.11
    See application file for complete search history.

(56) References Cited

U.S. PATENT DOCUMENTS

| | | | |
|---|---|---|---|
| 5,918,226 A | 6/1999 | Tarumi | |
| 6,101,479 A | 8/2000 | Shaw | |
| 6,556,974 B1* | 4/2003 | D'Alessandro | 705/7.32 |
| 7,720,737 B2* | 5/2010 | D'Alessandro | 705/36 R |
| 8,326,681 B2* | 12/2012 | Di Mario | 705/7.42 |
| 2001/0032029 A1 | 10/2001 | Kauffman | |
| 2002/0123945 A1 | 9/2002 | Booth | |
| 2005/0209732 A1* | 9/2005 | Audimoolam et al. | 700/216 |
| 2011/0035228 A1* | 2/2011 | Li et al. | 705/1.1 |

OTHER PUBLICATIONS

Appelbaum (Strategic organizational change: the role of leadership, Learning, motivation and productivity),Dec. 1998, Management Decision, pp. 289-301.*
Behn (One Approach to Performance Leadership), Dec. 2003, Performance Leadership—NPMRC.wpd, pp. 1-25.*

* cited by examiner

*Primary Examiner* — Romain Jeanty
(74) *Attorney, Agent, or Firm* — Akerman LLP; Peter A. Chiabotti; Roy P. Zachariah

(57) ABSTRACT

A system and method to simulate the impact of leadership activity for individuals in leader and/or manager roles to be able to model their organization as a system and to simulate a plurality of actions that might be taken and their impact on the non-linear dynamics of the organization, its functions, capabilities, processes and outcomes. The system includes an Organization State component, a Leadership Activities component, an Environment State component, and a Simulation Module component. The Simulation Module component takes in initial conditions defined for the Organization State, Leadership Activities and the Environment State, iterates the functions and process of the organization through time, simulates the interactions of the various variables described in the Organization State, the Leadership Activities and the Environment State and the interactive effects among them and provides outputs of a plurality of measures for each time step.

28 Claims, 7 Drawing Sheets

SYSTEM AND METHOD TO SIMULATE THE IMPACT OF LEADERSHIP ACTIVITY

CROSS-REFERENCE TO RELATED APPLICATIONS

This application is the national stage entry of International Application No. PCT/US2005/019921, filed Jun. 8, 2005, which claims priority to U.S. Provisional Application No. 60/578,999, filed Jun. 12, 2004, the disclosures of both of which are hereby incorporated by reference.

FIELD OF THE INVENTION

This present invention relates to a computer-implemented leadership simulation system and method, and in particular, to a system and method for simulating the impact of leadership activity for individuals in leader and/or manager roles to model their organization as a system and simulate a plurality of actions that might be taken, and their impact on the non-linear dynamics of the organization, and its functions, capabilities, processes and outcomes.

BACKGROUND OF THE INVENTION

Leadership simulations have been in use for years. Typically, leadership simulations are comprised of (1) books or periodicals which analyze organizational issues and offer advice regarding leadership and management interventions and likely outcomes, (2) generic computer modeling tools (such as spreadsheets), (3) graphical representation tools, (4) optimization analytics and system dynamic models to be used to model specific problems identified and codified by the user, (5) decision support tools which can be used to quantify the economic impact of various alternative approaches, (6) simulations of fictitious or composite firms used to offer virtual experiences similar to experiences likely to occur in actual organizations, and (7) role playing environments in which humans interact with each other and the environment in controlled situations, whether real, artificial or imagined, for the purpose of gaining leadership experience and learning leadership skills.

A problem with conventional leadership simulations is that they do not simulate the underlying non-linear dynamics of organizations in a way that exposes the realistic impact leadership, or management activity patterns and behaviors might have on short term performance and long term sustainability. Another problem with conventional leadership simulations is that they focus on the behaviors an individual might exercise as a leader of people, and not on the impacts the individual has on organizational processes and dynamics. Another problem with conventional leadership simulations is that they focus on individual decisions or problems to be solved, when the nature of organizations is that many actions and decisions are interconnected. This leads to what is called the 'law of unintended consequences': in an organizational context any action triggers many other events, many of which are unforeseen. In addition, dynamic systems such as organizations settle around attractor states and operate within an attractor basin of a complex system. Because of this, individual acts or decisions are small perturbations to the system which, in order to maintain operation in a state of dynamic equilibrium or stability, are dampened by the organizations balancing feedback loops. This implies that single decisions, if enacted in isolation, trigger counteracting actions which serve to dampen the initial effect. This organization leveling effect has been referred to as "policy resistance" because it is often observed empirically as countermeasures which serve to dampen the effects of policy intervention (See, Sterman, J. D. (2000), Business Dynamics: Systems thinking and modeling for a complex world, McGraw-Hill). Another problem with the above-referenced approaches is that they are limited to human-run organizations (e.g., for-profit and non-profit corporations, partnerships, etc.), and do not contemplate non-human organizations (such as computer systems), and leadership of computerized agents.

While the above-referenced solutions may be suitable for the particular purpose to which they address, they are not as suitable for individuals in leader and/or manager roles to be able to model their organization as a system and to simulate a plurality of actions that might be taken and their impact on the non-linear dynamics of the organization, its functions, capabilities, processes and outcomes. Additionally, the above solutions cannot be used to dynamically control complex computerized environments, where autonomous computerized agents must be organized and led.

Thus, there is presently a need for a system and method which enables individuals (or computerized agents) in leader and/or manager roles to be able to model their organization as a system and to simulate a plurality of actions that might be taken and their impact on the non-linear dynamics of the organization, its functions, capabilities, processes and outcomes.

SUMMARY OF THE INVENTION

An exemplary embodiment of the present invention comprises a method for implementing a leadership simulation including the steps of gathering data on at least one organization state variable, gathering data on at least one leadership activities variable, and calculating the performance of an organization based on the organization state and leadership activities variables.

Another exemplary embodiment of the present invention comprises a computer system including at least one server computer; and, at least one user computer coupled to the at least one server through a network, wherein the at least one server computer includes at least one program stored therein, said program performing the steps of accepting data on at least one organization state variable, accepting data on at least one leadership activities variable and, calculating the performance of an organization based on the organization state and leadership activities variables.

Another exemplary embodiment of the present invention comprises a computer readable medium having embodied thereon a computer program for processing by a machine, the computer program including a first code segment for accepting data on at least one organization state variable, a second code segment for accepting data on at least one leadership activities variable, and a third code segment for calculating the performance of an organization based on the organization state and leadership activities variables.

Another exemplary embodiment of the present invention comprises a computer data signal embodied in a carrier wave including a first code segment for accepting data on at least one organization state variable, a second code segment for accepting data on at least one leadership activities variable, and a third code segment for calculating the performance of an organization based on the organization state and leadership activities variables.

Another exemplary embodiment of the present invention comprises a method for implementing a leadership simulation including the steps of generating at least one organization state variable, generating at least one leadership activities variable, and calculating the performance of an organization based on the organization state, environment state, and leadership activities variables.

DETAILED DESCRIPTION

The present invention comprises, in one exemplary embodiment, a computer-implemented system and method to simulate the impact of leadership activity in an organization.

In view of the foregoing disadvantages inherent in existing leadership simulations, the present invention provides a new system and method to simulate the impact of leadership activity which can be utilized for individuals in leader and/or manager roles to be able to model their organization as a system and to simulate a plurality of actions that might be taken and their impact on the non-linear dynamics of the organization, its functions, capabilities, processes and outcomes.

The general purpose of the present invention, which will be described subsequently in greater detail, is to provide a new system and method to simulate the impact of leadership activity that has many of the advantages of the leadership simulations mentioned heretofore, and many novel features that result in a new system and method to simulate the impact of leadership activity.

The present invention generally comprises: (1) an input system of variables that define an organization's state, (2) an input system of variables that define leadership activities, (3) an input system of variables that define the environment's state, (4) a simulation module (which can be based upon any number of methods, such as for example, equation-based, discrete event, social network or agent-based modeling) (5) output reports, and (6) analysis and recommendations.

Figure 1:
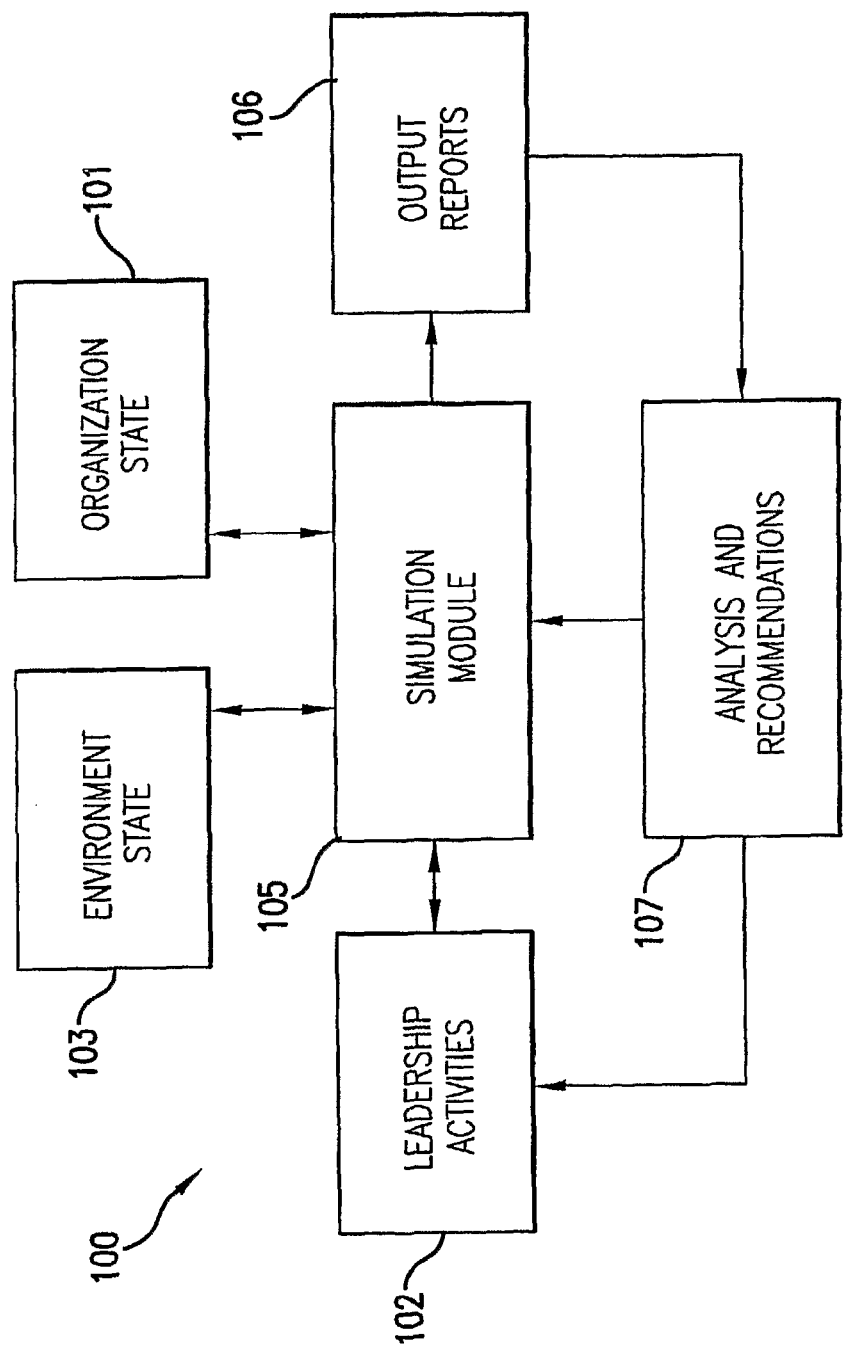
FIG. 1 is a block diagram showing the main components of a system according to an exemplary embodiment of the present invention.

FIG. 1 is a flow diagram showing the above-referenced elements of a system 100 according to an exemplary embodiment of the present invention, and their interconnection. The Organization State component 101 comprises a plurality of variables that reflect the states of various aspects of an organization (e.g., business corporation, non-profit, political or religious group) including but not limited to resources and capabilities. These variables define, among other things, economic rents called for generality performance rents, organizational slack, information flows, influence flows, resource flows, current capabilities and their exploitation, and the exploration for and development of new capabilities. Included are the ability to input initial conditions, the research instruments, systems and methods used to gather relevant data for input, and functions for these variables, and the analysis and reporting database and platform to provide access to information for analysis and benchmarking.

The Leadership Activities component 102 represents a plurality of factors described in leadership and management literature that are seen to have impact on the organization as a whole. These activities include transactional leadership activities, such as objective setting, reward for performance programs, supervision, training programs, personnel evaluation, hiring and firing, quality programs, budget review, performance management and other actions intended to improve efficiency and effectiveness. Also included are transformational leadership activities, such as strategy reviews and development, visioning sessions, communication programs, town hall meetings, skip level meetings, "all hands" meetings, customer focus programs, future focus, motivational speaking, cross-functional teams, initiatives and skunk works, brainstorming and action learning programs, symbols and activities intended to motivate, define future direction, align action, inspire confidence and increase intellectual stimulation. Also included are variables describing where inside the organization these activities occur, and the systems and methods for instrumenting the organization to collect data about how the organization's members are perceiving and responding to these actions. Included are the ability to input initial conditions, systems and methods, the research instruments used to gather relevant data for input, functions for these variables, and the ability to alter assumed leadership activity patterns to test alternate outcomes.

The Environment State component 103 consists of a plurality of variables that reflect the states of various aspects of the environment through time, including forecasts, expected variance, and probabilities. These include both old and new market size and growth, the affects of organizational actions on these markets, competitors, and other environmental factors, competition in both old and new markets and the implications of disruptive technologies to both old and new markets. Included are the ability to input initial conditions, the research instruments, systems and methods used to gather relevant data for input, and functions for these variables.

The Simulation Module component 105 takes in initial conditions and forecasts defined for the Organization State component 101, the Leadership Activities component 102, and the Environment State component 103, and iterates the functions and processes of the organization through time (either deterministically using mathematical equations, stochastically, or through some other method, such as agent-based modeling, discrete event simulation, game theory, or social network analysis), simulates the interactions of the various variables described in the Organization State, the Leadership Activities and the Environment State and the interactive effects among them, and provides outputs of a plurality of measures for each time step, and stores these outputs in a database.

The Output Reports component 106 provides a plurality of data about the Organization State component 101, Leadership Activity component 102 and the Environment State component 103 over time. These reports may be in the form of graphs, tables, data files, animations, videos, graphical or audio outputs that might for example resemble video games, or machine readable output files, for the purpose of either implementing protocols for agent action, or for further analysis and manipulation.

The Analysis and Recommendations component 107 reviews the input and output data, and compares the data to prior simulations and available empirical data to make recommendations or implement methods or stored protocols regarding the implications of various leadership activities on organizational variables and outcomes.

There has thus been outlined some important features of a system 100 according to an exemplary embodiment of the present invention. There are additional features of the exemplary embodiment that will be described hereinafter.

An object of the present invention is to provide a system and method to simulate the impact of leadership activity that will overcome the shortcomings of the prior art devices. Another object of the present invention is to provide a system and method to simulate the impact of leadership activity for individuals in leader and/or manager roles to be able to model their organization as a system so as to provide instrumentation that provides a detailed description of the organization's state over time, and to simulate a plurality of actions that might be taken and their impact on the non-linear dynamics of the organization, its functions, capabilities, processes and outcomes. Another object is to provide a system and method to simulate the impact of leadership activity that provides data to individuals (whether leaders, managers, consultants, administrators and/or policy makers) about the potential consequences for an organization of individual action or actions. For these purposes, an organization can be an aggregate of two or more individuals. Another object is to provide a system and method to simulate the impact of leadership activity that can be used to model the dynamic behavior of an organization under various conditions. This provides a means of verifying and improving the parameters used in the model and enables continued improvement of performance over time. This would include the impact of various environmental conditions on the performance of the organization both in a given period and over time. Another object is to provide a system and method to simulate the impact of leadership activity that can be used to model the impact of various leadership or management factors that characterize the organization, and their impact on the organization, for example but without limitation, on period performance (such as sales, profits, cash flow, Economic Value Added (EVA), and shareholder value) and sustainability (such as revenue and cash flow growth and adaptability) over time. Another object is to provide a system and method to simulate the impact of leadership activity that can be used to model the impact of the level of interdependence in the organization on the organization's tasks and task assignments, resources and resource allocation, knowledge and knowledge diffusion, and people or other autonomous actors (as well as the actors roles, influences, visibility to knowledge among other actors, and their interactions). Another object is to provide a system and method to simulate the impact of leadership activity that can be used to model the impact of the focus on potential versus historical performance of the organization and thus provide those in leadership roles with a simulation environment that acts as a "flight simulator" to help leaders navigate the organizational transformation or change process. Another object is to provide a system and method to simulate the impact of leadership activity that can be used to model the impact of the relative investment in exploration versus exploitation over time and under different and varying environmental conditions over time and thus support an organization's resource allocation decision process, strategic planning, leadership development and training programs, assessment and staffing, and succession planning.

As discussed above, the Organization State component 101 comprises a plurality of variables describing the simulated organization, that could be, but are not limited to, representing a real world organization at certain points in time, together with the relationships among these variables over time, which define some aspect of the organization's functioning and performance at a given point in time. As time passes, some but not necessarily all of the plurality of variables change and some but not necessarily all of a plurality of relationships change. This collection of variables and their values; the research instruments used when a real world organization is being simulated, such as surveys, interview protocols, calendar and use-of-time analysis, and observation and coding techniques to collect data; the relationships among them; and how they change through time; comprise the Organization State over time. Another object is to provide instrumentation, monitoring capability, and visibility into the organization's complex and dynamic inner workings over time.

The Organization State component 101 might vary in representation depending upon the organization's objectives, membership and outcomes. Objectives might vary as related to commercial profits, knowledge development or educational performance, political influence, military power, governmental agency or prison system, community service, religious or secular belief or the maximizing some other goods or services that are valued by the organization's members. The organizations membership might vary as related to commercial relationships, such as employment, contracted association or value sharing partnerships, teacher/learner relationships common in knowledge development, research or educational performance, political relationships such as political parties or interest groups, conscription or other government mandated relationship, such as in the military, community relationships, religious or secular belief systems or the self interest of individuals intent on maximizing some other goods or services that are valued by the organization's members. Outcomes might vary as related to commercial profits, knowledge acquired or developed, political influence achieved, military conquest or protection, governmental agency or prison system mandated outcomes, community service objectives, religious or secular belief objectives or the maximizing some other goods or services that are valued by the organization's members.

The Leadership Activities component 102 comprises a plurality of variables describing the leadership activity throughout the organization at certain points in time, together with the relationships among these variables over time, which define the system biasing or control exercised by leadership actions of some aspect, or all, of the organization's functioning and performance at a given point in time. As time passes, some but not necessarily all of the plurality of variables change and some but not necessarily all of a plurality of relationships change. This collection of variables, the survey, interview, use-of-time analysis, and research instruments used to collect and code data, the relationships among them and how they change through time comprise the Leadership Activities over time.

The Leadership Activities component 102 might vary in representation depending upon the organization's objectives, membership and outcomes. Objectives might vary as related to commercial profits, knowledge development or educational performance, political influence, military power, governmental agency or prison system, community service, religious or secular belief or the maximizing some other goods or services that are valued by the organization's members. The organization's membership might vary as related to commercial relationships, such as employment, contracted association or value sharing partnerships, teacher/learner relationships common in knowledge development, research or educational performance, political relationships such as political parties or interest groups, conscription or other government mandated relationship, such as in the military, community relationships, religious or secular belief systems, or the self interest of individuals intent on maximizing some other goods or service that is valued by the organization's members. Outcomes might vary as related to commercial profits, knowledge acquired or developed, political influence achieved, military conquest or protection, governmental agency or prison system mandated outcomes, community service objectives, religious or secular belief objectives or the maximizing some other goods or services that are valued by the organization's members. Changes to the above might vary the Leadership Activities represented with respect to, for example, but not limited to, varying degrees among directive behaviors or participative decision making, top-down versus bottom-up aspiration development activities, consensus achievement activities, situational decision making and aspiration development, and revelatory decision making and aspiration development.

The Environment State 103 comprises a plurality of variables describing the environment of the organization at certain points in time, together with the relationships among these variables over time, which define some aspect of the organization's functioning and performance potential at a given point in time. As time passes, some but not necessarily all of the plurality of variables change and some but not necessarily all of a plurality of relationships change. This collection of variables, the survey, interview and research instruments used to collect data, the relationships among them and how they change through time is defined as the Environment State over time.

The Environment State component 103 might vary in representation depending upon the organization's objectives, membership and outcomes. Objectives might vary as related to commercial profits, knowledge development or educational performance, political influence, military power, governmental agency or prison system, community service, religious or secular belief, or the maximizing some other goods or services that are valued by the organization's members. The organizations membership might vary as related to commercial relationships, such as employment, contracted association or value sharing partnerships, teacher/learner relationships common in knowledge development, research or educational performance, political relationships such as political parties or interest groups, conscription or other government mandated relationship, such as in the military, community relationships, religious or secular belief systems, or the self interest of individuals intent on maximizing some other goods or services that are valued by the organization's members. Outcomes might vary as related to commercial profits, knowledge acquired or developed, political influence achieved, military conquest or protection, governmental agency or prison system mandated outcomes, community service objectives, religious or secular belief objectives or the maximizing some other goods or services that are valued by the organization's members. The Environment State would thus be represented in terms related to objective, membership and outcomes.

The Simulation Module component 105 preferably comprises a software program written for a digital computer that, based upon input from a plurality of variables describing the Organization State component 101, Leadership Activities component 102 and the Environmental State component 103 at certain points in time, together with the relationships among these variables over time that defines some aspects of the organization's functioning and performance at a point in time, determines the Organization State, Leadership Activities, and Environment State and each subsequent point in time. As time passes, some but not necessarily all of the plurality of variables change and some but not necessarily all of a plurality of relationships change. This collection of variables, relationships and how they change through time is stored in the Simulation Module as a data set for use by the Output Reports component of the system. Thus, experiments can be performed by the Simulation Module, and the data collected can be used for results analysis. For example, the Simulation Module may generate outputs (based on the input variables) such as 'total revenue generated by the organization over a specific time period,' referred to below as Total Performance Rents Collected (TPRC). Another output which may be generated from the input variables by the Simulation Module is 'cash flow over a specific time period,' referred to below as Resources Available to the Firm (RAF). Analysis of theses types of outputs will assist the organization in determining which input variables provide the most beneficial results (i.e., most revenue, best cash flow position, etc.) to the organization.

Figure 2:
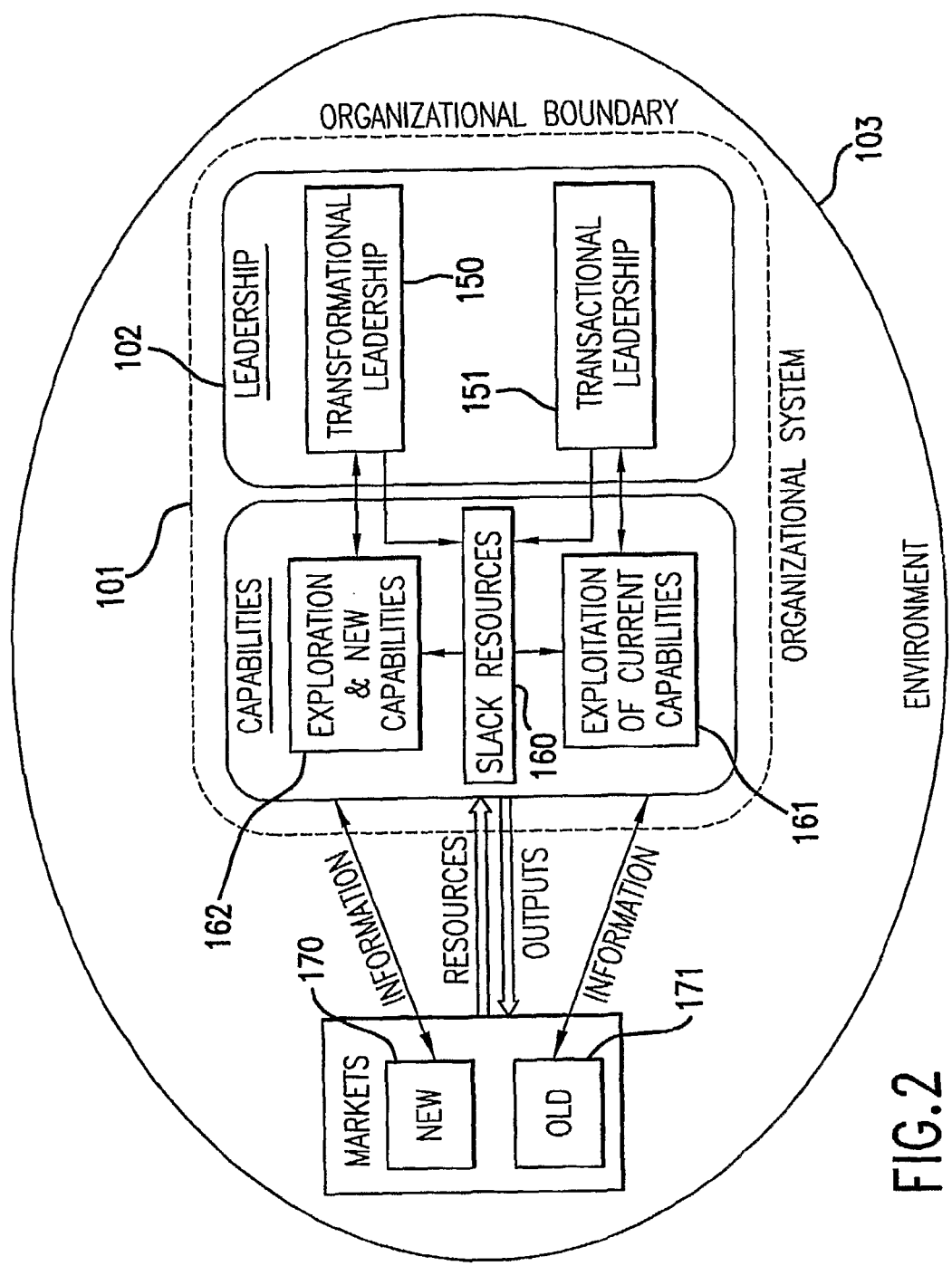
FIG. 2 is diagram showing some components and variables of a system according to an exemplary embodiment of the present invention.

FIG. 2 is an example of some state variables and their relationships. For example, variables within the Leadership Activities component 102, such as Transformational Leadership Activity (TrLA) 150 and Transactional Leadership Activity (TLA) 151 are shown in FIG. 2. Also shown are variables from the Organization State Component 101, such as Slack Resources (SRes) 160, Current Capabilities for Exploitation (CCE) 161, and New Capabilities from Exploration (NCEx) 162. New Market Carrying Capacity (NMCC) 170 and Old Market Carrying Capacity (OMCC) 171 are variables from the Environment State component 103 also represented in FIG. 2. These variables and the interactions between them will be explained in detail below.

The Simulation Module component 105 may be software or hardware based, or may comprise actions carried out by human beings, or a combination thereof. The Simulation Module component 105 may be represented as mathematical equations or models; and it may utilize various software approaches such as Rules Based Systems, Expert Systems, Linear Programming, Various Optimization techniques, agent-based modeling, multi-agent modeling, cellular automata, network analysis, system dynamics modeling. It may also be continuous or discrete; and it may include the modeling of a single organization, multiple organizations or a component or components of a single organization.

The Output Reports component 106 preferably comprises a software program written for a digital computer that, based upon the data set created by the Simulation Module component 105, displays the data in a variety of ways, both standard and custom, for the purposes of analysis. The Output Reports display data related to a plurality of variables describing the Organization State, Leadership Activities and the Environmental State at each point in time, together with the relationships among these variables over time that defines some aspects of the organization's functioning and performance at each point in time and in summary form as defined by the user. Thus results of experiments can be analyzed and conclusions inferred for the results Analysis and Recommendations component 107.

The Output Reports may take the form of 1, 2 or 3 dimension graphs or graphics, higher dimension graphs or graphics projected in 1, 2 or 3 dimensions, tables, arrays, data files, auditory signals, light pulses, time dependent displays such as videos, or computer simulations that resemble, but are not limited to, video games.

The Analysis and Recommendations component 107 is a collection of techniques used to analyze the Output Reports, and that, based upon the data set created by the Simulation Module and the values of the variables from the Organization State, Leadership Activities and Environment State, determines in a variety of ways, interventions that might be effectively implemented in the subject organization. The Analysis and Recommendations component 107 can also select from among established leadership activity protocols in a knowledge-base and implement them, as for example, in an organization of computerized actors or as a training program or action plan intended to guide the behaviors of human actors. The Analysis and Recommendations component predicts real-world outcomes which can be expected to be measured in the subject organization using the same data gathering techniques, that is, the survey, interview, system database queries and reports, and research instruments used to collect input data for the Organization State, Leadership Activities and Environmental State components. The Analysis and Recommendation component, together with data gathered from the organization through the survey, interview, system database queries and reports, and research instruments used to collect data, can also be used modify, through progressive iterations of comparison and modification, the relationships embodied in the Simulation Module. Thus, results of experiments can be analyzed and conclusions inferred to continuously improve the Simulation Module's predictive power with respect to the organization it is intended to simulate, whether real or artificial. The techniques employed include variations of mathematical and iterative analysis with real world measurements of the subject organization, scenario analysis, stochastic analysis, Monte Carlo analysis, agent-based modeling, network analysis, system dynamics, game theory, various optimization and convergence techniques.

As is shown in FIG. 1, the Organization State 101 is connected to the Leadership Activities 102 in that the state of Leadership Activity variables impact changes to Organization State variables and vice versa. Leadership Activities 102 are connected to the Environmental State 103 in that the Environment State variables impact changes to Leadership Activity variables. The Organization State 101 is connected to the Environment State 103 in that the Environment State variables impact changes to Organization State variables.

The Simulation Module 105 is connected to the Organization State 101 in that the Simulation Module uses Organization State variables as inputs to its processing and then it outputs new values for Organization State variables at each time step. The Simulation Module 105 is connected to the Leadership Activities 102 in that the Simulation Module uses Leadership Activity variables as inputs to its processing and then it outputs new values for leadership Activity variables at each time step. The Simulation Module 105 is connected to the Environment State 103 in that the Simulation Module uses Environment State variables as inputs to its processing and then it outputs new values for Environment State variables at each time step.

The Simulation Module 105 is also connected to the Output Reports 106 in that the output of the Simulation Module is the input for Output Reports. The Output Reports 106 are connected with Analysis and Recommendations 107 in that Output Reports are inputs to Analysis and Recommendations. Analysis and Recommendations 107 are connected to the Simulation Module 105 in that Analysis and Recommendations may lead to changes in the Simulation Modules. If multiple organizations are simulated, the Organization State variables and Leadership Activity variables for each organization are connected to one another in that the values of each become inputs to the other.

The Organization State component 101 includes a series of variables that are used to define the state of the organization at each point in time and over time together with the research instruments, systems and methods used to collect the values of said variables. Variables according to an exemplary embodiment of the present invention are discussed below.

Using research instruments such as survey instruments, whether by telephone, Internet, or face-to face; interview protocols, whether by telephone, Internet, or face-to face; observation and coding techniques, whether by telephone, Internet, or face-to face as well as either software assisted or manually performed; Internet search engines or other data mining techniques; electronic surveillance techniques whether of electronic communication, computer, Internet or network usage or of physical environments through video or audio equipment, or forecasts and/or assumptions, initial values for the variables are established and values for these variables over time may be predicted.

In the exemplary implementation described below, the research instruments used were data mining from published case studies and assumptions made by the researcher. Any of the other techniques, as well as others included in the context of this invention but not listed, could also have been used in the exemplary implementation described. Variables include, but are not limited to: Total Performance Rent Collected (TPRC) which is the total value of the tangible and intangible goods or services, as represented either in dollars or other metric, that is returned to the organization from the environment as the organization executes all of its capabilities in the aggregate. In the exemplary embodiment, TPRC is measured in U.S. dollars. Tax Rates, Investor Returns, and Other Fees are variables measuring the organization's external costs which limit the application of TPRC to internal organizational uses. In the exemplary embodiment, Tax Rates, Investor Returns, and Other Fees are measured in a percent of U.S. dollars.

Return Rate (RR) is a variable that describes the rate at which TPRC is returned to the organization for internal use. In the exemplary embodiment, RR is measured as a percent of U.S. dollars. Resources Available to the Firm (RAF) is a variable that describes the TPRC returned to the organization for internal use. In the exemplary embodiment, it is measured is U.S. dollars. Required for Operations (RFO) is a variable that describes the rate at which RAF are consumed by the organization for internal use using the most efficient means possible, given the level of Current Capabilities for Exploitation (CCE). CCE may comprise such things as physical, intangible or financial assets, Property Plant and Equipment (PP&E), current assets and liabilities, production capabilities, industry or company knowledge, process knowledge, policies, procedures, routines, training programs, and human capital and people such as, but not limited to, skilled and unskilled workers, managers and professionals whether employees, contractors or contracted for services such as outsourced services and the interconnections and interdependences among all of the above. In the exemplary embodiment, RFO is measured as a percent of U.S. dollars. Nest Feathering (NF), which measures the rate resources that could be Slack (SRes) are instead absorbed slack resources by the firm, describes the rate at which RAF are consumed by the organization for internal use that is in excess of the most efficient means possible given the level of CCE. This is a measure of, for example, but not limited to, management perquisites, excess compensation, organizational inefficiencies, unauthorized projects or skunk works, sub-optimal supplier contracts, under-utilized or under-trained employees or contractors, and unresolved individual/organization agency conflicts consuming organizational resources. In the exemplary embodiment, NF is measured as a percent of U.S. dollars.

Slack Resources (SRes) is a variable that describes the RAF that are returned to the organization for discretionary internal use. In the exemplary embodiment, SRes is measured in U.S. dollars. Slack Rate (SRa) is a variable that describes the rate at which RAF are converted to SRes and are thus retained by the organization for discretionary projects, or are available for excess compensation to certain subsets of stakeholders (e.g., senior management, shareholders, etc. in one-time payouts or stock repurchase programs). In the exemplary embodiment, SRa is measured as a percent of U.S. dollars. Exploitation Allocation Rate (EAR) is a variable that describes the rate at which SRes are allocated by the organization for discretionary projects to improve the exploitation of current capabilities. These would include but not be limited to quality programs, process technology investment, training, and incremental capacity development. In the exemplary embodiment, EAR is measured as a percent of U.S. dollars. Exploitation Resources (ER) is a variable that describes the accumulated level of resources allocated by the organization for discretionary projects to improve the exploitation of current capabilities. These would include, but not be limited to, resources targeted for investment in quality programs, process technology investment, increased inventory (or other current assets), training and hiring programs or other activities that increase human capital, investment in property plant and equipment (PP&E) or information technology (IT) infrastructure, leadership development programs and succession planning efforts that improve executive management capabilities, and incremental capacity development. In the exemplary embodiment, ER is measured in U.S. dollars.

Exploitation Capabilities Creation Rate (ECCR) is a variable that describes the rate at which CCE are developed from ER. ECCR represents the activities and conversion efficiency (and associated time delay) of resources into capabilities. This variable represents the process of capability development and includes but is not limited to the complex process of analysis, decision, execution, work rules, knowledge management, coordination, supervision, hiring & firing, training and project management. In the exemplary embodiment, ECCR is measured as a percent of U.S. dollars. Current Capabilities Exploitation (CCE) represents the potential of the organization to extract TPRC from the environment for each capability. Examples of incremental increases in capabilities might include: efficiency improvements due to technology or business model enhancements, capacity additions or increased productivity, and improved modes of communication or connection (as might be the case in certain political or religious organizations) such as without limitation, personnel programs, hiring and on-boarding policies, performance management programs, knowledge management, etc. In the exemplary embodiment, CCE is measured in U.S. dollars. Exploitation Capabilities Dissipation Rate (ECDR) is a variable that describes the rate at which CCE decline assuming no incremental maintenance investment is made and includes obsolescence associated with changing environmental requirements and technology. For example, depreciation is an approximate metric. In the exemplary embodiment, ECDR is measured as a percent of U.S. dollars. Rent From Current Capabilities Exploitation (RFCCE) is a variable that describes the portion of TPRC that is gathered from the environment due to the CCE resident in the organization. It represents the actual extraction of TPRC from the environment for each individual capability in the organization, and in the aggregate. In the exemplary embodiment, RFCCE is measured in U.S. dollars. Performance Reporting Delay (PRD) measures the time delay between events and the availability of information about the events for use within the organization.

Exploration Allocation Rate (ExAR) is the variable that describes the rate at which Slack Resources (SRes) are allocated by the organization for discretionary projects to explore for opportunities and new ways of doing things, and develop new capabilities. These would include, but not be limited to, resources targeted for investment in outside board memberships and professional associations, Research & Development (R&D) programs, conferences, trade shows, executive education, general education programs, strategic alliances, joint ventures and partnerships, new technology investment and new ventures and cross functional initiatives, and other activities intended to increase an organization's absorptive capacity, and its ability to understand and respond to the environment. In the exemplary embodiment, ExAR is measured as a percent of U.S. dollars. Exploration Resources (ExR) is a variable that describes accumulated level of resources allocated by the organization for discretionary projects to explore and develop new capabilities. These would include, but not be limited to, resources targeted for investment in R&D programs, new technology investment, new products and programs, new ventures and cross functional initiatives, merger and acquisition (M&A) activities, joint ventures, and strategic partnerships. In the exemplary embodiment, ExR is measured in U.S. dollars.

Exploration Capabilities Creation Rate (ExCCR) is a variable that describes the rate at which New Capabilities from Exploration (NCEx) are developed from ExR. It represents the activities and conversion efficiency of resources to capabilities (and the associated time delay). This variable represents the process of capability development and includes but is not limited to the complex process of analysis, decision, execution, work rules, knowledge management, coordination, supervision, hiring & firing, training and project management. In the exemplary embodiment, ExCCR is measured as a percent of U.S. dollars. NCEx is the variable that represents the potential of the organization to extract TPRC from the environment for each new capability. New capabilities might include the capacity to offer new products and services, address new market or other environmental needs, or gain new areas of political or religious influence. As such, NCEx may comprise such things as physical, intangible or financial assets, Property Plant and Equipment (PP&E), current assets and liabilities, production capabilities, industry or company knowledge, process knowledge, policies, procedures, routines, training programs, and human capital and people such as, but not limited to, skilled and unskilled workers, managers and professionals whether employees, contractors or contracted for serves such as outsourced services and the interconnections and interdependences among all of the above. In the exemplary embodiment, NCEx is measured in U.S. dollars.

Exploration Capabilities Dissipation Rate (ExCDR) is a variable that describes the rate at which NCEx decline assuming no incremental maintenance investment is made and includes obsolescence associated with changing environmental requirements and technology. For example, depreciation is an approximate metric. In the exemplary embodiment, ExCDR is measured as a percent of U.S. dollars. Rent From New Capabilities from Exploration (RFNCEx) is a variable that describes the TPRC that is gathered from the environment due to the NCEx resident in the organization. It represents the actual extraction of TPRC from the environment for each new capability, and in the aggregate and includes market and environmental interactions. In the exemplary embodiment, RFNCEx is measured in U.S. dollars. Explore Reporting Delay (ExRD) measures the time delay between events, and the availability of information about the events for use within the organization.

In sum, the variables for the Organization State component 101 include the following:

| | |
|---|---|
| Total Performance Rent Collected | TPRC ($R^{Collected}$) |
| Return Rate | RR ($r^{Return}$) |
| Resources Available to the Firm | RAF ($R^{Available}$) |
| Required for Operations | RFO ($r^{Ops}$) |
| Current Capabilities for Exploitation | CCE ($C^{Exploit}$) |
| Nest Feathering | NF ($r^{Absorb}$) |
| Slack Resources | SRes ($R^{Slack}$) |
| Slack Rate | SRa ($r^{slack}$) |
| Exploitation Allocation Rate | EAR ($r^{Exploit}$) |
| Exploitation Resources | ER ($R^{Exploit}$) |
| Exploitation Capabilities Creation Rate | ECCR ($\alpha_{Exploit}$) |
| Exploitation Capabilities Dissipation Rate | ECDR ($\epsilon_{Exploit}$) |
| Rent From Current Capabilities for Exploitation | RFCCE ($r^{exploit}$) |
| Performance Reporting Delay | PRD ($\delta_{Perform}$) |
| Exploration Allocation Rate | ExAR ($r^{Explore}$) |
| Exploration Resources | ExR ($R^{Explore}$) |
| Exploration Capabilities Creation Rate | ExCCR ($\alpha_{Explore}$) |
| New Capabilities from Exploration | NCEx ($C^{Explore}$) |
| Exploration Capabilities Dissipation Rate | ExCDR ($\epsilon_{Explore}$) |
| Rent From New Capabilities for Exploration | RFNCEx ($r^{explore}$) |
| Explore Reporting Delay | ExRD ($\delta_{Adapt}$) |
| Time Delay New Capability Development | TDExCD ($\delta_{Explore}$) |
| Time Delay Exploitation Capability Development | TDECD ($\delta_{Exploit}$) |

Another component of the present system 100 is the Leadership Activities component 102. The Leadership Activities component 102 includes a series of variables that are used to define the state of Leadership Activity in the organization at each point in time, and over time, together with the research instruments used to collect the values of said variables. Variables according to an exemplary embodiment of the present invention are discussed below.

Using research instruments such as observation, survey instruments, whether by telephone, Internet, or face-to face; interview protocols, whether by telephone, internet, or face-to face; observation and coding techniques, whether by telephone, internet, or face-to face as well as either software assisted or manually performed; time-reporting or Customer Resource Management (CRM) systems, communication portals, electronic survey services, or other data collection platforms, Internet search engines or other data mining techniques; electronic surveillance techniques whether of electronic communication, computer, Internet or network usage or of physical environments through video or audio equipment, or assumptions, initial values for the variables are established and values for these variables over time may be predicted.

In the exemplary embodiment, the research instruments used were data mining from published case studies and assumptions made by the researcher. Any of the other techniques, as well as others included in the context of this invention but not listed, could also have been used in the exemplary embodiment.

Variables include, but are not limited to: Transactional Leadership Activity (TLA), a variable that measures the level of activity for various types of transactional leadership activity that influences people in the organization who in turn influence a given organizational capability, all capabilities, and in the aggregate. These would include, but would not be limited to, activities considered to be sound management practice, such as objective setting, reward-for-performance programs, control and monitoring, role clarity, task structuring and assignment, load balancing, resource allocation, training, knowledge management, leadership development, communication training and systems, succession planning and programs, project management, supervisory coaching and training, performance management, hiring, firing and on-boarding, budget reviews, management by exception, decision-making, execution, performance aspiration setting and designing and implementing compensation programs and human resource policies that promote the above. In the exemplary embodiment, TLA is measured in activities of each type per month throughout the organization and in each work group. Transacting Leadership Creation Rate (TLCR) is a variable that describes the rate at which TLA increases due to pressure to perform either through endogenous forces or exogenous ones. In the exemplary embodiment, TLCR is measured as a percent of TLA per time period. Transacting Leadership Dissipation Rate (TLDR) is a variable that describes the rate at which TLA declines due to organizational fatigue, institutional resistance or the persistence of bureaucratic processes assuming no incremental pressure (i.e., no positive Transaction Leadership Creation Rate). In the exemplary embodiment, TLDR is measured as a percent of TLA per time period. Exploitation Aspirations (EA) is a variable which measures an organization's members' current understanding of the organization's vision, mission strategy and objectives and their role in addressing the organization's performance objectives and aspirations in its current state with its current capabilities. These may or may not be aligned with actual external market carrying capacity depending on the leadership quality metrics described below. In the exemplary embodiment, EA is measured in U.S. dollars per time period. Actual Performance Versus Aspiration Gap (APvAG) is a variable that measures the organization members' understanding of the actionable, articulated, organizationally understood gap between EA, and measured Performance with Reporting Delay (PRD). PRD represents the time delay between events in the environment and the organization's members awareness and interpretation of performance. APvAG represents the level of understanding by the organization's members of the gap between TA and PRD and their level of engagement and commitment to the organization to close the gap (e.g., APvAG). APvAG applies pressure to perform, which under the right conditions may create increased TLCR and thus TLA. In addition, external Pressure to Perform (PTP) is the variable that measures the organization's members' perceived need to perform due to external pressure and this may also have a positive influence on TLCR and thus TLA.

Transformational Leadership Activity (TrLA) is a variable that measures the level of activity for various types of transformational leadership activity that influences people in the organization who in turn influence a given organizational capability, all capabilities, and in the aggregate. These would include activities often described as change management, and well as transformational, charismatic and strategic leadership such as developing a shared vision, defining the nature and position of the organization's boundary in the context of identity and transactions, resources and moral and ethical principles, instilling an enterprise perspective with portfolio management disciplines, focusing the organization on opportunities, leading in decision-making and communicating, providing individualized consideration, offering intellectual stimulation and excitement, building credibility and integrity through policies but also through role modeling, enabling action by breaking down barriers and boundaries, challenging existing processes, being a role model, encouraging teamwork and team self-governance and self-regulation, managing across team boundaries, building team learning and decision making skills, creating and integrating future state aspirations across many teams and work groups, bringing focus to the most promising ideas, providing consistent decision making context, aligning people with their passions, integrate market and environment feedback into decision making, demand collaboration, creating dissatisfaction with the current state of situation, setting future vision and pathways, goal alignment, town meetings, skip level meetings, cross functional initiatives, R&D resource allocation processes, skunk works and venturing sponsorship, strategy reviews, future state aspiration setting and designing and implementing compensation programs and human resource policies to promote the above. In the exemplary embodiment, TrLA is measured in activities of each type per month. Transformational Leadership Creation Rate (TrLCR) is a variable that describes the rate at which TrLA increases due to pressure to change which develops either endogenously or exogenously. In the exemplary embodiment, TrLCR is measured as a percent of TrLA per time period. Transformational Leadership Dissipation Rate (TrLDR) is a variable that describes the rate at which TrLA declines due to organizational fatigue, institutional resistance or bureaucratic persistence assuming no incremental pressure to change (i.e., no positive Transformational Leadership Creation Rate). In the exemplary embodiment, TrLDR is measured as a percent of TrLA per time period. Transforming Aspirations (TA) is a variable which measures an organization's members' understanding of the organization's vision, mission and strategy for the future and their role in forming and achieving the vision of it's future state, and it's aspirations related to identifying new opportunities in the environment, developing new capabilities and gathering performance rents from these new opportunities such as markets. These TA may or may not be aligned with actual external market carrying capacity depending on the leadership quality metrics described below. In the exemplary embodiment, TA is measured in U.S. dollars per time period.

Current State Versus Desired State Gap (CSvDSG) is the variable that measures the organization's members' understanding of the actionable, clearly-articulated, organizationally understood gaps between the organization's desired state as defined by TA, and its current state as indicated information represented by the variable Explore Rents with Reporting Delay (ERRD). ERRD takes into account the delay and interpretation involved in identifying events and reporting their results for purposes of decision and action. This variable applies pressure to change which, under the right conditions, may create increase TrLCR and thus TrLA. External Pressure to Change (PTC) is the variable that indicates the organization's members' perceived need for change based upon exogenous factors.

Leadership activities impact the Organization State and it's variables on an iterative basis in a number of ways. TLA exerts Transaction Leadership Efficiency Pressure (TLEP), so as to reduce the rate of Nest Feathering (NF), and thus increase the Slack Rate (SR). TLA also influences a function called Investment in Exploitation (IIE) which influences the Exploitation Allocation Rate (EAR). TrLA impacts the function Investment in Exploration (IIEx) which influences the Exploration Allocation Rate (ExAR), and through a different function, Investment in Initiatives (III), TrLA also influences ExAR as specific opportunities for the creation of new capabilities are identified and initiatives are organized. TLA and TrLa are balanced in their influences on EAR and ExAR through the additional leadership influence function Balance Exploitation and Exploration (BEEx).

The following leadership qualities also affect the Leadership Activities component 102 of the system 100 in significant ways.

Leadership Quality 1—Cognitive Capacity (CogCap) is a function applied differentially to each type of Leadership Activity referenced above in each situation to account for the individual and collective ability of individual leaders and managers to identify, qualify and process Organization State and Environment State information in forming aspirations, both exploitation aspiration EA and transforming aspirations TA, and to handle the cognitive load associated with understanding opportunities for intervention, deciding on a course of action, and intervening timely and effectively in a complex organizational system to establish collective aspirations, alignment and action plans. CogCap thus represents a dimension of the quality of leadership in an organization, and in the exemplary embodiment, is unit-less.

Leadership Quality 2—Communication Skill (ComSk) is a function applied differentially to each type of Leadership Activity above in each situation as leadership activity impacts aspiration gaps, both APvAG and CSvDSG, to account for the individual and collective ability of leaders and managers to assimilate, integrate, synthesize and communicate clearly and effectively the organization's current state in relation to its aspirations, the gaps between them that what is necessary to close those gaps. Understanding these gaps fosters employee engagement and commitment and drives action; ComSk thus represents a dimension of the quality of leadership in an organization, and in the preferred embodiment is unit-less.

Leadership Quality 3—Development Capacity (DevCap) is a function applied differentially to each type of Leadership Activity above in each situation to account for the organization's capacity to develop leaders and put the right individuals with the right skills and experiences in the right leadership roles. The value of this function impacts the creation rate for new activities both TLCR and TrLCR and thus the levels of TLA and TRLA. Ultimately, these levels impact other Organization State and Leadership Activities variables, such as: TLEP, IIE, IIEx, III and BEEx. Because the individuals selected for leadership roles have incremental influence on outcomes, this is thus a dimension of the quality of leadership in an organization, and in the preferred embodiment is unit-less.

Leadership Quality 4—Risk Aversion (RskAv) is a function applied differentially to each type of Leadership Activity above in each situation to account for the individual and collective tendency to avoid or assume risk, to make timely and high quality decisions, and to execute such decisions with information about the organization and the environment so as to match the organization's capabilities with the needs of the environment. The value of these function impacts the level of influence leadership activities have on resource allocation rates, including both EAR and ExAR through the functions IIE, IIEx, III and BEEx. Because this impacts tendency and timeliness of action, it thus represents a dimension of the quality of leadership in an organization, and in the exemplary embodiment is unit-less.

In sum, the variables for the Leadership Activities component 102 include the following:

| | |
|---|---|
| Transactional Leadership Activity | TLA ($L^{Transact}$) |
| Transacting Leadership Creation Rate | TLCR ($\alpha_{Transact}$) |
| Time Delay to Enact Transacting Leadership | TDTLA ($\delta_{Transact\,Enact}$) |
| Transacting Leadership Dissipation Rate | TLDR ($\zeta^{Transact}$) |
| Exploitation Aspirations | EA ($a^{Exploit}$) |
| Actual Performance Versus Aspiration Gap | APvAG ($g^{Exploit}$) |
| Transformational Leadership Activity | TrLA ($L^{Transform}$) |
| Transformational Leadership Creation Rate | TrLCR ($\alpha_{Transform}$) |
| Time Delay to Enact Transformational Leadership | TDTrLA ($\delta_{Transform\,Enact}$) |
| Transformational Leadership Dissipation Rate | TrLDR ($\zeta^{Transform}$) |
| Transforming Aspirations | TA ($a^{Transform}$) |
| Current State Versus Desired State Gap | CSvDSG ($g^{Transform}$) |
| Explore Rents with Reporting Delay | ERRD ($\delta_{Explore}$) |
| Performance Reporting Delay | PRD ($\delta_{Perform}$) |
| Cognitive Capacity | CogCap (LQ1) |
| Communication Skill | ComSk (LQ2) |
| Development Capacity | DevCap (LQ3) |
| Risk Aversion | RskAv (LQ4) |
| Pressure to Perform | PTP ($\rho_{Perform}$) |
| Pressure to Change | PTC ($\rho_{Change}$) |
| Transactional Leadership Efficiency Pressure | TLEP ($l^{Transact}$) |
| Investment in Exploitation | IIE ($i^{Exploit}$) |
| Investment in Exploration | IIEx ($i^{Explore}$) |
| Investment in Initiatives | III ($i^{Initiatives}$) |
| Balance Exploitation and Exploration | BEEx ($\epsilon$) |

Another component of the present system 100 is the Environment State component 103. The Environment State component 103 includes a series of variables that are used to define the state of the organization at each point in time, and over time together with the research instruments, systems and methods used to collect the values of said variables. Variables according to an exemplary embodiment of the present invention are discussed below.

Using research instruments such as survey instruments, whether by telephone, Internet, or face-to face; interview protocols, whether by telephone, Internet, or face-to face; observation and coding techniques, whether by telephone, Internet, or face-to face as well as either software assisted or manually performed; Internet search engines or other data mining techniques; electronic surveillance techniques whether of electronic communication, computer, Internet or network usage or of physical environments through video or audio equipment, or assumptions, initial values for the variables are established and values for these variables over time may be predicted. In the exemplary embodiment, the research instruments used were data mining from published case studies and assumptions made by the researcher. Any of the other techniques, as well as others included in the context of this invention but not listed could also have been used in the example case described.

Variables include, but are not limited to: Old Market Carrying Capacity (OMCC) is a variable measuring the level of performance rents available to all organizations in each existing market, market segment and in the aggregate, assuming the organizations have the capabilities to extract the rents (e.g., demand). Although markets are used in this discussion, those of ordinary skill in the art will realize that the environment may be represented as having carrying capacity of any resource of value, such as political influence, religious influence, etc. In the exemplary embodiment, OMCC is measured in U.S. dollars per time period. Disappearing Old Markets (DOM) is the rate OMCC decreases over time, although a negative value is allowed (implying positive growth in some old markets, market segments or in the aggregate). In the exemplary embodiment, DOM is measured in U.S. dollars per time period. Old Market Competition (OMC) represents the competitive dynamics that characterize the existing markets. This may be a simple market share calculation, or a separate function or simulation model that simulates the competitive effects of markets given the other state variables in the system.

New Market Carrying Capacity (NMCC) is the level of performance rents available to all organizations in each new market, market segment and in the aggregate, assuming the organizations have the capabilities to extract the rents (e.g., demand). Although markets are used in this discussion, those of ordinary skill in the art will realize that the environment may be represented as having carrying capacity of any resource of value, such as political influence, religious influence, etc. In the preferred embodiment, NMCC is measured in U.S. dollars per time period. Growth in New Markets (GNM) is the rate at which NMCC increases over time. In the exemplary embodiment, GNM is measured in U.S. dollars per time period. New Market Competition (NMC) represents the competitive dynamics that characterize the new markets. This may be a simple market share calculation, or a separate function or simulation model that simulates the competitive effects of markets given the other state variables in the system.

In sum, the variables for the Environment State component 103 include the following:

| | |
|---|---|
| Old Market Carrying Capacity | OMCC ($M^{Old}$) |
| Disappearing Old Markets | DOM ($\alpha_{Old}$) |
| Old Market Competition | OMC ($\gamma_{Old}$) |
| New Market Carrying Capacity | NMCC ($M^{New}$) |
| Growth in New Markets | GNM ($\alpha_{New}$) |
| New Market Competition | NMC ($\gamma_{New}$) |

The above-referenced variables from the Organization State, Leadership Activities and Environment State components 101-103 may be generated in various manners. For example, one or more of these variables may be determined empirically from data gathering from the organization. Alternately, one or more of these variables may be modeled or simulated based on presumed interactions between human beings, and emergent knowledge, relationships and network structures that result. For example, an additional computer program may be utilized to simulate human interactions within an organization and provide a synthesis for one or more such state variables as its outputs. Such a variable generation program may comprise part of the above-described system 100, or may comprise part of a separate system.

Another component of the system 100 is the Simulation Module component 105. The Simulation Module component 105 uses a plurality of processing approaches to manipulate the state variables in the Organization State, Leadership Activities and Environment State components 101-103, to simulate changes to these state variables over time.

Another component of the system 100 is the Output Reports component 106. The Output Reports component 106 includes the output describing the state variables of the Organization State, Leadership Activities and Environment State components 101-103 over time, their relationships, and their values. These reports are based upon the data set created by the Simulation Module component 105. Output Reports display data in a variety of ways, both standard and custom, for the purposes of analysis. Using Output reports, results of experiments can be analyzed and conclusions inferred for the Analysis and Recommendations component 107, or implemented as established protocols.

The final component of the system 100 is the Analysis and Recommendations component 107. The Analysis and Recommendations component 107 is a collection of techniques used to analyze the Output Reports (generated by the Output Reports component 106), and based upon the data set created by the Simulation Module component 105, and the values of the variables from the Organization State, Leadership Activities and Environment State components 101-103, determine interventions that might be effectively implemented in the subject organization. The Analysis and Recommendations component 107 predicts real world outcomes which can be expected to be measured in the subject organization using the same data gathering techniques, that is, the survey, interview and research instruments, systems and methods used to collect input data for the Organization State, Leadership Activities and Environmental State components 101-103. The Analysis and Recommendation component 107 can also provide leadership protocols for implementation as outputs. The Analysis and Recommendation component 107, together with data gathered from the organization through the survey, interview and research instruments, systems and methods used to collect data, can also be used modify, through progressive iterations, the relationships embodied in the Simulation Module. Thus, results of experiments can be analyzed and conclusions inferred to continuously improve the Simulation Module's predictive power with respect to the organization it is intended to simulate (whether real or artificial).

Figure 3:
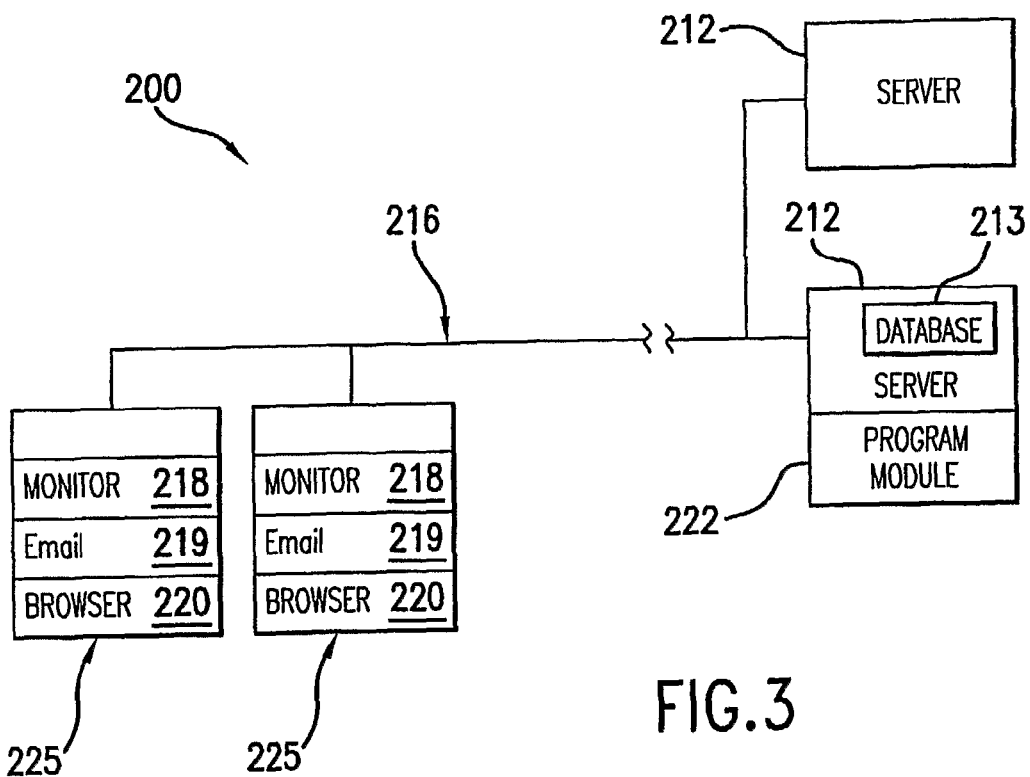
FIG. 3 is a block diagram showing a computer system according to an exemplary embodiment of the present invention.

FIG. 3 shows a client-server computer system 200 according to an exemplary embodiment of the present invention which may be utilized to carry out a method according to an exemplary embodiment of the present invention. The computer system 200 includes a plurality of server computers 212 and a plurality of user computers 225 (clients). The server computers 212 and the user computers 225 may be connected by a network 216, such as for example, an Intranet or the Internet. The user computers 225 may be connected to the network 216 by a dial-up modem connection, a Local Area Network (LAN), a Wide Area Network (WAN), cable modem, digital subscriber line (DSL), or other equivalent connection means (whether wired or wireless).

Each user computer 225 preferably includes a video monitor 218 for displaying information. Additionally, each user computer 225 preferably includes an electronic mail (e-mail) program 219 (e.g., Microsoft Outlook®) and a browser program 220 (e.g. Microsoft Internet Explorer®, Netscape Navigator®, etc.), as is well known in the art. Each user computer may also include various other programs to facilitate communications (e.g., Instant Messenger™, NetMeeting™, etc.), as is well known in the art.

One or more of the server computers 212 preferably include a program module 222 (explained in detail below) which allows the user computers 225 to communicate with the server computers and each other over the network 216. The program module 222 may include program code, preferably written in Hypertext Mark-up Language (HTML), JAVA™ (Sun Microsystems, Inc.), Active Server Pages (ASP) and/or Extensible Markup Language (XML), which allows the user computers 225 to access the program module through browsers 220 (i.e., by entering a proper Uniform Resource Locator (URL) address). The exemplary program module 222 also preferably includes program code for facilitating a method of simulating leadership activity among the user computers 225, as explained in detail below.

At least one of the server computers 212 also includes a database 213 for storing information utilized by the program module 222 in order to carry out the leadership simulation. For example, values for the variables for the Organization State component 101, Leadership Activities component 102, and Environment State component 103 may be stored in the database. Although the database 213 is shown as being internal to the server in FIG. 3, those of ordinary skill in the art will realize that the database 213 may alternatively comprise an external database. Additionally, although database 213 is shown as a single database in FIG. 3, those of ordinary skill in the art will realize that the present computer system may include one or more databases coupled to the network 216.

Figure 4:
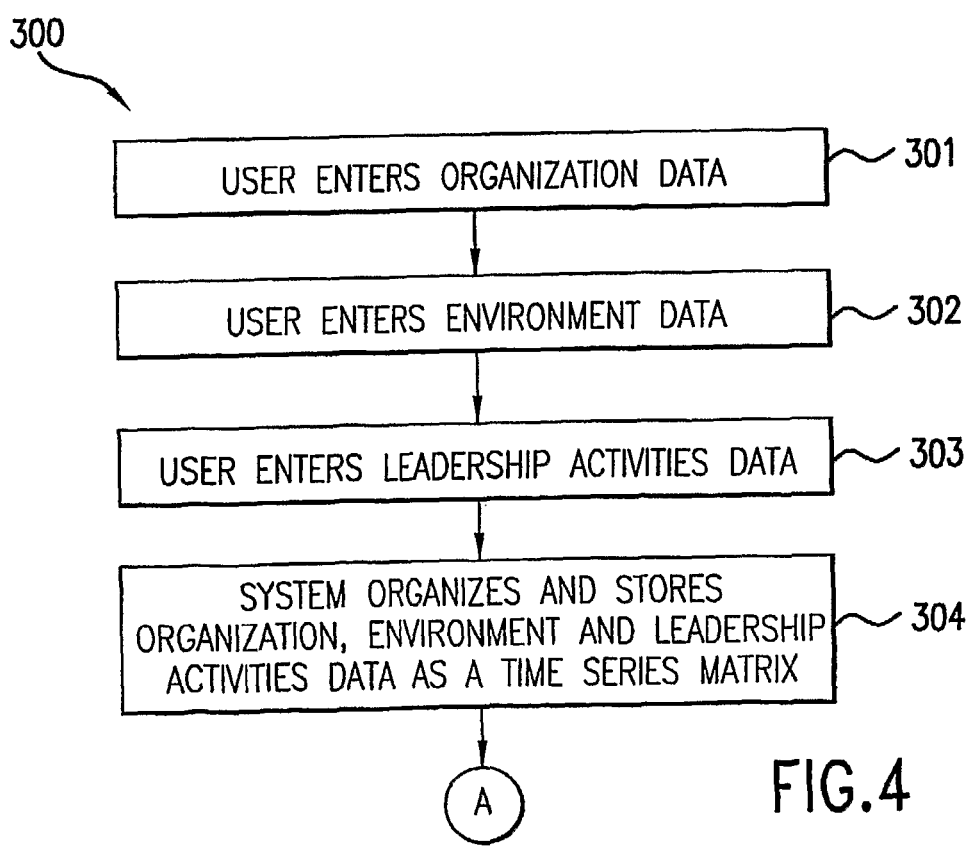
FIG. 4 is a flow chart showing a method for implementing a leadership simulation according to an exemplary embodiment of the present invention.

FIG. 4 shows a first portion of a method for implementing a leadership simulation 300 which includes a first step 301 of a user entering organization data (relating to the Organization State component 101 of the system 100) into one of the user computers 225 connected to the network 216. Once entered, the organization data is preferably transmitted over the network 216 to one or more of the server computers 212 where it is stored in one or more databases 213. Next, a user enters environment data (relating to the Environment State component 103 of the system 100) into one of the user computers 225 connected to the network 216 (step 302). Once entered, the environment data is preferably transmitted over the network 216 to one or more of the server computers 212 where it is stored in one or more databases 213. Additionally, a user enters leadership activities data (relating to the Leadership Activities component 102 of the system 100) into one of the user computers 225 connected to the network 216 (step 303). Once entered, the environment data is preferably transmitted over the network 216 to one or more of the server computers 212 where it is stored in one or more databases 213. It will be noted by those or ordinary skill in the art that the particular order in which the organization data, environment data and leadership activities data are entered is not material to the present invention. In fact, the present invention relates to the entry of portions of each set of data in any order, or any fashion. Alternatively, any one of the above data sets (or all) could be entered electronically by a system interface that is coupled to a simulation program that generates such inputs, or entered electronically from systems used in organizations to support operations and financial reporting.

At step 304, the organization data, environment data and/or leadership activities data are organized and stored as a time series matrix. As with the entered data, the time series matrix may be stored on the server computers 212 in the one or more databases 213.

Figure 5:
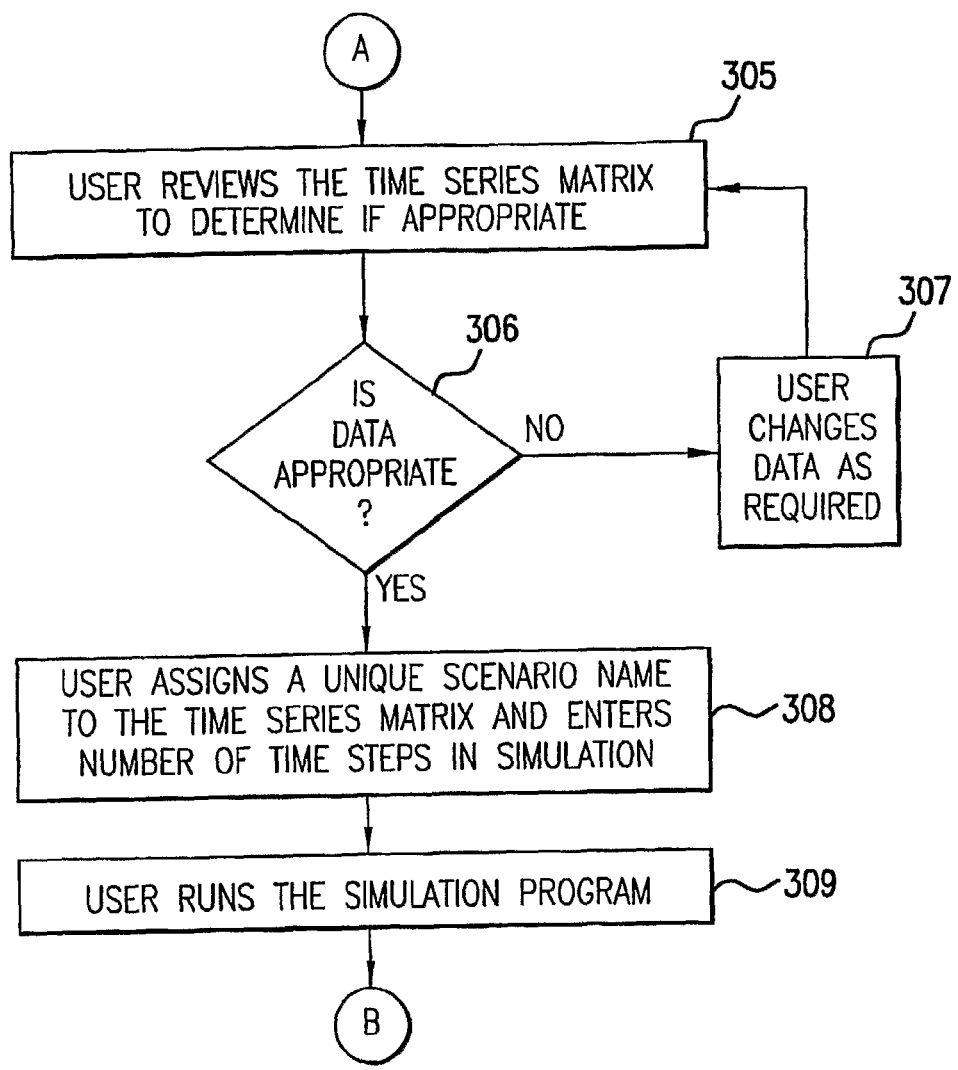
FIG. 5 is a flow chart showing additional steps in a method for implementing a leadership simulation according to an exemplary embodiment of the present invention.

FIG. 5 shows a second portion of a method for implementing a leadership simulation 300 which includes a step 305 of a user reviewing the time series matrix stored at step 304. If the time series matrix is accurate (step 306), the method proceeds to step 308 where the user assigns a unique scenario name to the time series matrix (e.g., Scenario 1), and selects a specific number of time steps for the simulation. If the time series matrix requires amendments or changes, the user is permitted to change the time series matrix data as appropriate at step 307. If the time series matrix has been amended at step 307, the user again reviews the matrix data at step 306 to determine if it is accurate. Those of ordinary skill in the art will understand that a user may reiterate steps 305-307 until the time series matrix data is accurate. Once a unique scenario name and number of time steps have been assigned to the time series matrix at step 308, the method proceeds to step 309 where the time series matrix is subjected to the simulation (by the Simulation Module component 105 of the system 100).

Figure 6:
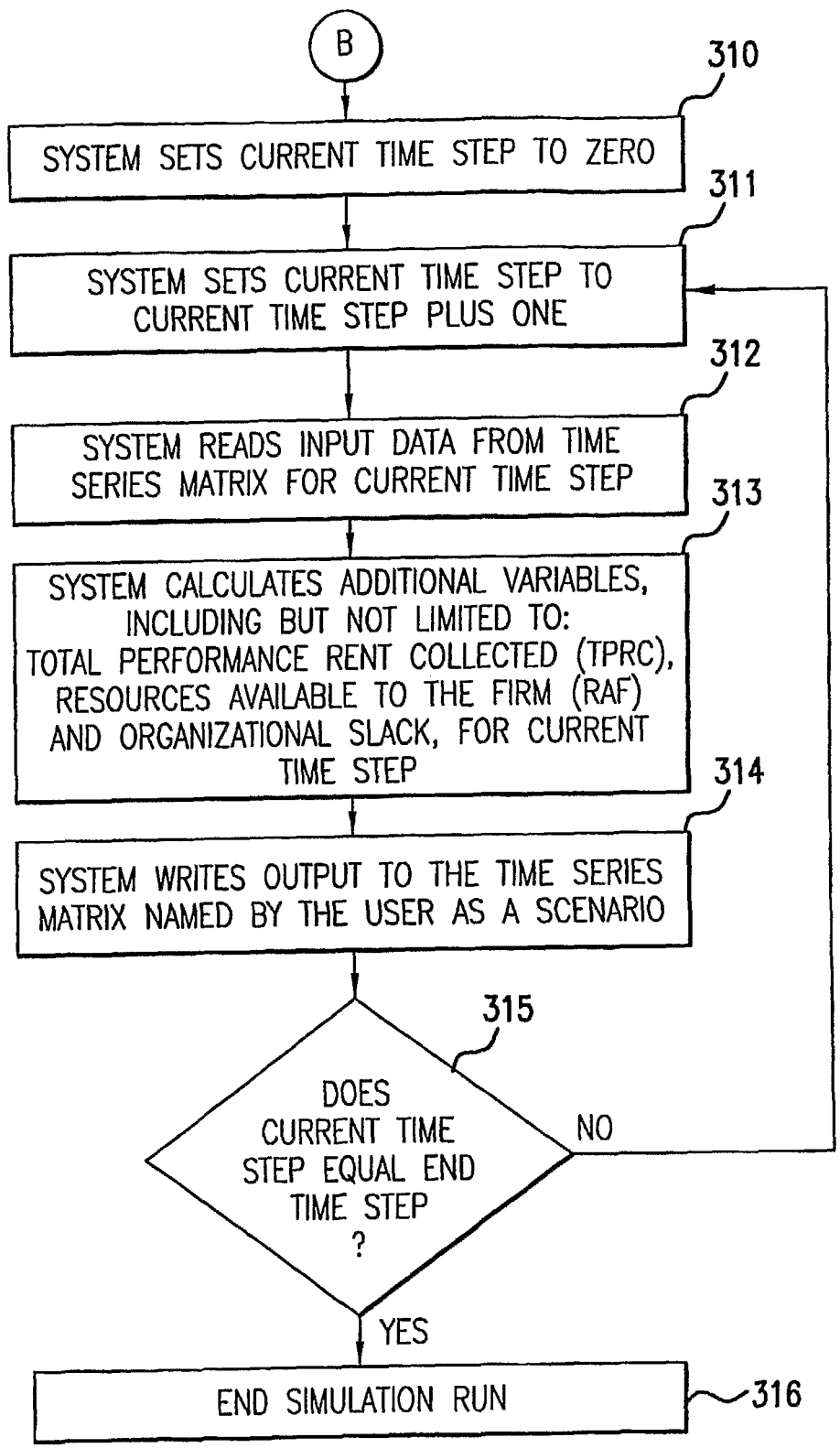
FIG. 6 is a flow chart showing additional steps in a method for implementing a leadership simulation according to an exemplary embodiment of the present invention.

FIG. 6 shows a third portion of a method for implementing a leadership simulation 300 which includes a step 310 of setting the current time step for the simulation to zero (0).

Next, the current time step is increased by one (1), at step 311 (e.g., t=1). At this point, the time series matrix for the current time step is entered into the simulation program (step 312). The simulation program calculates and determines various outputs based on the input time series matrix data, including but not limited to, Total Performance Rent Collected (TPRC), Resources Available to the Firm (RAF), Slack Resources (SRes), Exploitation Resources (ER), Exploration Resources (ExR), Current Capabilities for Exploitation (CCE), New Capabilities from Exploration (NCEx), Rent From Exploitation (RFCCE), Rent from Exploration (RFNCEx), Transactional Leadership Activity (TLA), and Transformational Leadership Activity (TrLA) for the current time step (e.g., t=1) (step 313). These outputs (e.g., TPRC, RAF, etc.) are generated and written to a file or files corresponding to the unique scenario name (e.g., Scenario 1) assigned to the time series matrix in step 308 (step 314). Next, the current time step (e.g., t=1) is compared to an end time step, as entered in step 308 above (step 315). If the current time step is equal to the end time step, the simulation is ended at step 316. If the current time step is not equal to the end time step, the method returns to step 311 where the current time step is increased by one (1) (e.g., from t=1 to t=2). Although the discrete time-step approach to modeling time described is used in the preferred embodiment, other approaches to modeling time, such as considering time as a continuous function, treating time relativistically, or allowing different models of time within different variable interactions and then synchronizing system elements, are also contemplated as included in this invention.

Figure 7:
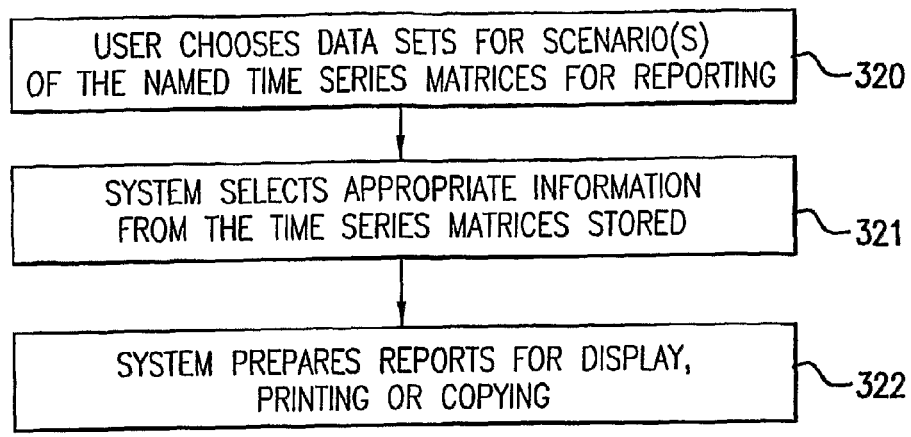
FIG. 7 is a flow chart showing additional steps in a method for implementing a leadership simulation according to an exemplary embodiment of the present invention.

FIG. 7 shows steps 320-322 in a process for creating reports from the simulation results which is part of the method for implementing a leadership simulation 300. The process starts with step 320 where the user selects particular data sets from a unique scenario or scenarios for which reports will be prepared (e.g., Scenario 1). For example, a user may select to generate a report on Transactional Leadership Activity (TLA) in a particular unique scenario (e.g., Scenario 1). Once the scenario(s) and data sets have been selected by the user, the data is retrieved at step 321 from the corresponding time series matrixes (stored in the one or more databases 213 of the one or more of the server computers 212). Finally, reports in a specific format are generated and displayed at step 322.

Figure 8:
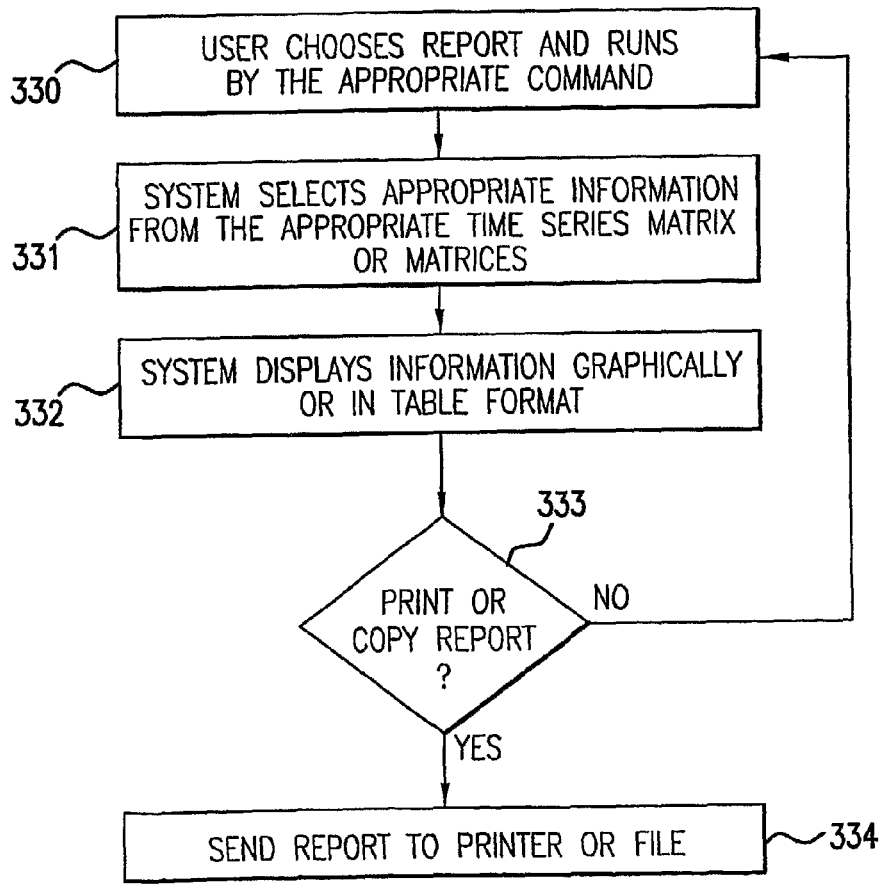
FIG. 8 is a flow chart showing additional steps in a method for implementing a leadership simulation according to an exemplary embodiment of the present invention.

FIG. 8 shows steps 330-334 for displaying reports generated in steps 320-322 in various formats (e.g., graphs, tables etc.). This process is preferably carried out by the Output Reports component 106 of the system 100. The process starts with step 330 where a user chooses a particular report (e.g., on TLA), and a particular display format. The system then retrieves the information from the corresponding time series matrix (matrices) (step 331), and displays the information in the selected format (step 332). As this point, the user may perform various computer functions with the report, such as copying, printing, etc., or may select additional reports for display (step 333). If the user selects to print the present report, the report is copied to the selected file, or printed (step 334). If not, the user is directed to step 330, where a new report may be displayed.

Figure 9:
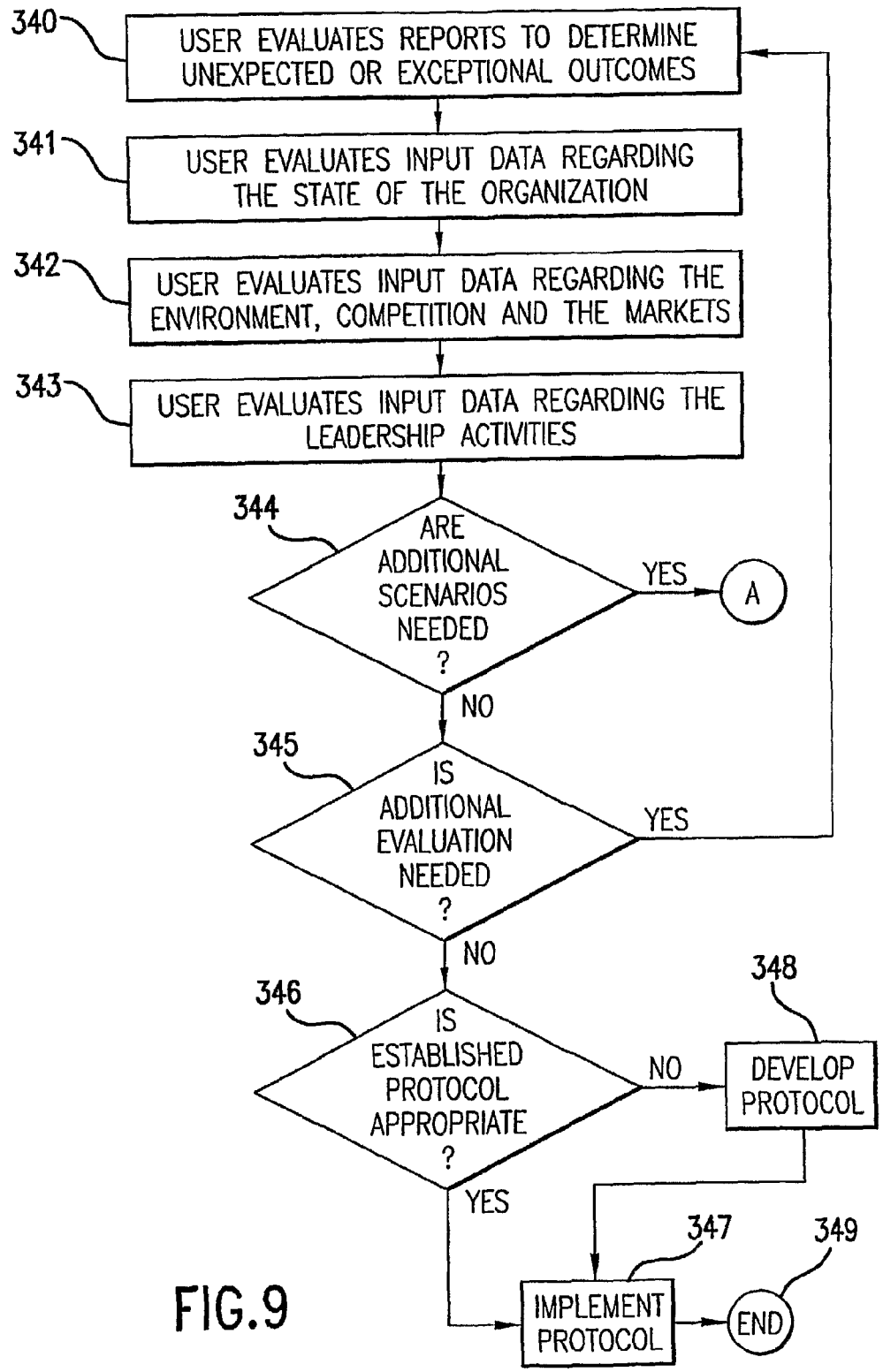
FIG. 9 is a flow chart showing additional steps in a method for implementing a leadership simulation according to an exemplary embodiment of the present invention.

FIG. 9 shows steps 340-346 in a process for analyzing reports from the simulation results which is part of the method for implementing a leadership simulation 300. This process is preferably carried out by the Analysis and Recommendations component 107 of the system 100. The process starts with step 340 where the user evaluates the report(s) for a particular scenario (e.g., Scenario 1) to determine if there are unexpected or exceptional outcomes. Then, the user evaluates the input organization data input at step 301 (step 341), the environment data input at step 302 (step 342), and the leadership activities data input at step 303 (step 343). Those of ordinary skill in the art will realize that the particular order or fashion in which the organization, environment, and leadership activities data are reviewed are not material. At step 344, the user determines if additional scenarios are necessary. If so, the proceed proceeds back to step 305 (FIG. 5), where the user can review the input data and create new scenarios. If no additional scenarios are needed, the process proceeds to step 345, where the user determines if additional evaluation is needed. If so, the process proceeds back to step 340, so that the user can perform additional evaluation. If no additional evaluation is needed, the user proceeds to step 346 where the user determines if an established leadership protocol is appropriate for implementation (i.e., whether an established leadership practice can be utilized to change the results of the organization). If the user agrees that an established protocol can be implemented, such a protocol (or protocols) are implemented at step 347, and the process ends at step 349. If there are no established leadership protocols appropriate for the situation, the user may develop a new leadership protocol at step 348. Once developed, the protocol is implemented at step 347 (as above), the process ends at step 349. Those of ordinary skill in the art will realize that once these protocols are implemented, the Organization State, Environmental State and Leadership Activities may change in the organization, and that these changes, can be gathered as data and input to the system and method for additional simulations.

Although the above-described method 300 is preferably carried out by a computer system, those of ordinary skill in the art will realize that human beings can carry out many of the steps of the method (with or without the assistance of a computer), and such actions of human beings are intended to be within the scope of the present invention.

Next, the mathematical processes performed by the Simulation Module component 105 will be described. In addition to the method described below, other non-equation-based analytical methods, such as agent-based or network modeling, expert systems, artificial intelligence or robotic modeling of individual interactions could also be used, and are intended to be included in this description. At each time step, Rent From Current Capabilities For Exploitation (RFCCE), $r^{exploit}$, in dollars per unit of time, and Rent From New Capabilities From Exploration (RFNCEx), $r^{explore}$, in dollars per unit of time, are added and integrated to obtain Total Performance Rent Collected (TPRC), $R^{Collected}$. In equation form:

$$R^{Collected} = \int_0^t (r^{Exploit} + r^{Explore}) dt$$

An amount, $r^{gov}$, calculated as a percentage of $R^{Collected}$ for each time step, is assumed due to governmental or other institutions (e.g., taxes). Also, for simplicity, an amount, $r^{investor}$, also calculated as a percentage of $R^{Collected}$ for each time step, is assumed to be due investors as returns to capital (ROC) whether to creditors, equity holders or option holders, paid out as interest, dividends Return on Assets (ROA), Return on Equity (ROE), etc. The remaining dollars flow at Return Rate (RR), $r^{Return}$, to become integrated as Resources Available to the Firm (RAF), $R^{Available}$, in equation form and expanding RR:

$$R^{Available} = \int r^{Return} dt \quad (0.1)$$

$$R^{Available} = \int_0^t [R^{Collected} - (r^{gov} * R^{Collected}) - (r^{investor} * R^{Collected})] dt$$

$$= \int_0^t [(1 - r^{gov} - r^{investor}) * R^{Collected}] dt$$

Some of the RAF are consumed at a rate, $r^{ops}$, in efficient operations. Resources remaining are either absorbed at rate $r^{Absorbed}$ in Nest Feathering (NF) activities, or flow at Slack Rate (SRa) $r^{slack}$ to unabsorbed Slack Resources (SRes), $R^{Slack}$. In equation form:

$$R^{Slack} = \int_0^t [R^{Available} - (r^{ops} * R^{Available}) - (r^{absorbed} * R^{Available})] dt \quad (0.2)$$

$$= \int_0^t [(1 - r^{ops} - r^{absorbed}) * R^{Available}] dt \quad (0.3)$$

$$= \int_0^t [(r^{slack} * R^{Available})] dt \quad (0.4)$$

To calculate $R^{Collected}$ more directly, recall that $R^{Collected}$ is the integral of the sum of rents, $r = r^{Exploit} + r^{Explore}$, collected from various organizational capabilities interacting with external markets. Defining a function, $f^{rent}$, as rent appropriation from capabilities, C, in markets, M, then results in:

$$R^{Collected} = \int_0^t r \, dt = \int_0^t f^{rent}(C, M) \, dt \quad (0.5)$$

Where M is the market carrying capacity. In this case for rents associated with Exploitation, $R_{Exploit}^{Collected}$, for each time step, in the exemplary embodiment we assume for simplicity that the minimum between actual dollars of Old Market Carrying Capacity (OMCC) and the potential dollars associated with Current Capabilities for Exploitation (CCE) becomes the rent for that time period. In equation form:

$$R_{Exploit}^{Collected} = \int_0^t r^{Exploit} dt = \int_0^t [\text{Min}((1 - \gamma) * M^{Old}, C^{Exploit})] dt \quad (0.6)$$

Where $\gamma = \gamma_{Old}$ is the proportion of the market carrying capacity that goes to Old Market Competition (OMC), $M^{Old}$ is the OMCC servicing existing capabilities, and $C^{Exploit}$ is the rent producing potential of CCE.

Finally, we know that the rate with which CCE, $C^{Exploit}$, are developed is determined by a function of the stock level of Exploitation Resources (ER), $R^{Exploit}$. Thus, a function, $f^{convert}$, is defined characterizing the conversion of resources into capabilities over time, such that in general:

$$C = \int_0^t f^{convert}(R) \, dt \quad (0.7)$$

In this case, for a particular time step, we assume:

$$C_t = C_{t-1} + \alpha R_{t-\delta} - \epsilon C_{t-1} \quad (0.8)$$

where $\alpha$ is the rate of resource conversion to capabilities, $\delta$ is the time delay between resource allocation and capabilities development, and $\epsilon$ is capabilities dissipation rate. When we consider this equation in the context of Current Capabilities for Exploitation (CCE), the factors become: $\alpha_{Exploit}$ which is the Exploitation Capabilities Creation Rate (ECCR), the rate of resource conversion to capabilities, $\delta_{Exploit}$ is Time Delay for Exploitation Capabilities Development (TDECD), the time delay between resource allocation and capabilities development, and $\epsilon_{Exploit}$ is Exploitation Capabilities Dissipation Rate (ECDR). When we consider this equation in the context of New Capabilities for Exploitation (NCE), the factors become: Exploration Capabilities Creation Rate (ExCCR) $\alpha_{Explore}$, which is the rate of resource conversion to capabilities, $\delta_{Explore}$ is Time Delay for New Capabilities Development (TDExCD), the time delay between resource allocation and capabilities development, and $\epsilon_{Explore}$ is Exploration Capabilities Dissipation Rate (ExCDR).

So in general we have:

$$R_{Exploit}^{Collected} = \int_0^t f^{Rent} \left[ \int_0^t f^{Convert}(R^{Exploit}) \, dt, M^{Old} \right] dt \quad (0.9)$$

In the exemplary embodiment, it is assumed:

$$R_{Exploit}^{Collected} = \int_0^t [\text{Min}((1 - \gamma_t) M_t^{Old}, C_{t-1} + \alpha R_{t-\delta} - \epsilon C_{t-1}) \, dt \quad (0.10)$$

Where $M^{Old}$ is the OMCC, and where $R_{Exploit}^{Collected}$ is the subset of TPRC, $R^{Collected}$, derived from the CCE, including incremental efficiency improvements.

The OMCC in old or current markets is the sum of net exchange rates of many market participants interacting. Each participant exchanges resources with the focal firm, and with its competitors, in return for their outputs. Thus, OMCC is a measure of the aggregate rate at which resources, net of cost of creating the outputs, flow from the market to the firm and its competitors. That is, OMCC is a measure of the economic rent available to the firm in the market.

Assuming that the probability that any given participant in the market will leave the market is the same for each participant, the constant, $a = a_{Old}$, is called the decay rate (if <0) and growth rate (if >0), and represents the aggregate effect of participants leaving the old markets over time. The differential equation describing decay at a constant rate over time, t, has the form:

$$\frac{dM^{Old}}{dt} = aM^{Old}, a < 0 \quad (0.11)$$

Separating terms and rewriting as an integral we have:

$$\int \left(\frac{1}{M^{Old}}\right) dM^{Old} = \int a \, dt \quad (0.12)$$

Integrating:

$$\ln M^{Old} = at + \ln M_0^{Old} \quad (0.13)$$

Where $M_0^{Old}$ is the initial value of the market. Exponentiating:

$$M^{Old} = M_0^{Old} e^{at}, a < 0, \quad (0.14)$$

Thus, for forecasting purposes the size of the OMCC addressed by CCE is defined over time according to an exponential decay curve. In the exemplary embodiment, the value of the parameters may be set to determine the initial market size, $M_0^{Old}$, in dollars per unit of time, and its decay rate, a. From this, the potential rent available to all competitors at each time step may be calculated. This rent available to the focal firm can then be scaled according to a function Old Market Competition (OMC) $\gamma_{Old}$. As a simplifying assumption in the exemplary embodiment, this analysis assumes the firm has constant market share.

Beginning with unabsorbed Slack Resources (SRes) available for investment, $R^{Slack}$, some Exploration Resources (ExR), $R^{Explore}$, could be dedicated to exploration at an Exploration Allocation Rate (ExAR), $r^{Explore}$. In the exemplary embodiment, there is no assumption that investment in exploration can be done with borrowed funds, that is, SRes must be available for exploration investment to occur, however, this is a simplifying assumption in the exemplary embodiment and is not a requirement nor a limitation for this invention. Thus, the inequality for resource allocation to exploration is:

$$R^{Explore} \leq R^{Slack} - \int_0^t r^{Exploit} dt \quad (0.15)$$

Where $r^{Exploit}$ is the EAR, and its integral is the total resources invested in exploitation.

In the next step, ExR are converted into the New Capabilities From Exploration (NCEx). Unlike the exploitation scenario, however, successful exploration requires significant learning before new capabilities with potential to capture rents can be created. The creation of new capabilities is thus delayed somewhat as learning allows knowledge about the environment to build up to a level wherein new capabilities can be developed. This delay is represented by the variable TDExCD ($\delta_{Explore}$). This phenomenon has been called 'absorptive capacity,' and has been shown to imply significant delays in capabilities development. As such, the equation for converting exploratory resource to capabilities is:

$$C^{Explore} = \int_0^t f^{convert}(R^{Explore}) dt \quad (0.16)$$

where $f^{convert}$ includes the time delay $\delta_{Explore}$. Assuming, the same logic in exploration as exploitation, the equation for TPRC from both exploitation and exploration is:

$$R^{Total} = \int_0^t f^{rent}\left(\int_0^t f^{convert}(R^{Exploit}) dt, M^{Old}\right) dt + \int_0^t f^{rent}\left(\int_0^t f^{convert}(R^{Explore}) dt, M^{New}\right) dt \quad (0.17)$$

Where $M^{New}$ is the Carrying Capacity of New Markets (NMCC) to be addressed by exploration. The exploration conversion components of the function $f^{convert}$ will be discussed after NMCC.

Although other equations can be used to forecast NMCC over time, for illustrative purposes, the NMCC is defined over time as a logistics, or S-curve. This function is characterized by accelerating growth to a point and then leveling off as the market saturates. It often characterizes infection rates or the substitution of a qualitatively better product for another. For the exemplary embodiment, parameters are set that determine the initial market size for the existing capabilities, its growth rate against the remaining headroom and its maximum value. From this the potential rent available to all competitors at a time step may be calculated. This value can also be scaled by a function that represents New Market Competition (NMC), $\gamma_{New}$. For simplicity, in this analysis constant market shares are assumed. Mathematically, the equation is:

$$M_t^{New} = m/(1+e^{d-at}) \quad (0.18)$$

Where $M^{New}$ is the NMCC, m is the maximum level that the market can reach and d and $a=\alpha_{New}$ are parameters which determine the "length" of the S-curve. All of these are exogenous parameters that can be varied in virtual experiments or other forecasting methods.

The level of Transaction Leadership Activity (TLA) is measured on an index representing the number of leadership activities per unit of time. The exemplary embodiment assumes there is a delay between a change in level of TLA, and the impact on Exploitation Aspirations (EA), Exploitation Allocation Rate (EAR) and the Nest Feathering (NF). Although in this invention these delays may be different, the preferred embodiment assumes a single delay and this length of the delay is a parameter, $\delta_{Transact}$, in the model that can be varied. In addition, there is a typical management reporting cycle delay, $\delta_{Perform}$, for example, three (3) months for financial results, impacts the timing of information about the organization's performance available to inform leadership activities.

Post delay, based upon the level of TLA, $L^{Transact}$, the firm's EA, $a^{Exploit}$, is set (or reset). In addition to the level of leadership activity, signals from the environment, such as, perceived existing market carrying capacity and competitive dynamics, as well as, internal perceptions about the firm's CCE, $C^{Exploit}$, are used to set performance aspirations. The EA, that is, the organization's rent producing goal over time, $a^{Exploit}$, is in dollars per unit of time. It represents the expectations of the organization for rent from CCE in the preferred embodiment. If the parameter called Pressure to Perform (PTP) or $\rho_{Perform}$ is greater than a particular threshold value, then the perceived addressable market is assumed to be the driver of aspirations, and the formula is as follows:

$$a_t^{Exploit} = \hat{M}_t^{Old} \quad (0.19)$$

Where $\hat{M}^{Old}$ is an interpreted view of addressable market size after competitors take their share. This internal assessment of the market is based upon the interpretation of information returned to the system. Thus, this function is likely to be quite complex. For simplicity, the effects of this interpretation process are represented in the exemplary embodiment as the actual market size, less market share lost to competition, times an exploitation collective cognition factor (CogCap) LQ1. This simplification is intended to approximate the process of aspirations setting.

If PTP ($\rho_{Perform}$) does not meet the threshold value then, is a function that EA depends upon softer internal metrics, such as, maintaining current performance and, as a function the level of TLA, the partial closure of any perceived gap. For the exemplary embodiment, the formula used is:

$$a_t^{Exploit} = r_{t-\delta}^{Exploit} + L^{Transact} * (\hat{M}_t^{Old} - r_{t-\delta}^{Exploit}) \quad (0.20)$$

Where $L^{Transact}$ is the level of TLA, and $r_{t-\delta}^{Exploit}$ is reported performance (i.e., RFCCE) after Performance Reporting Delay (PRD), $\delta_{Perform}$. Although not shown, in the exemplary embodiment, this value is again moderated by the function CogCap (LQ1).

Once EA, $a^{Exploit}$, is set, the perceived and Actual Performance Versus Aspiration Gap (APvAG), $g^{Exploit}$, based upon these aspirations, is subject to two (2) distinct delays, both of which can also introduce errors. These are (1) aspirations must be codified into programs and these must be enacted, communicated and executed, and (2) information regarding actual performance rents collected are subject to reporting delays. This internal assessment of the gap is based upon the interpretation of information returned to the system. Thus, this function is likely to be quite complex. For simplicity, the effects of this interpretation process are represented in the exemplary embodiment as a factor that measures Communications Skill (ComSk) LQ2, that moderates the understanding of the gap. This simplification is intended to approximate the process of communications and alignment.

When these delays are considered, reported actual rents are compared with aspirations to determine the gap, if any that exists. The level of Transactional Leadership Activity, $L^{Transact}$, once again moderates the timing and effectiveness of the enactment process. Thus, the equation is:

$$g_t^{Exploit} = L_t^{Transact} * (a_{t-\delta^{enact}}^{Exploit} - r_{t-\delta^{report}}^{Exploit}) \quad (0.21)$$

Where g is the APvAG, L the level of TLA, a is the aspiration level and r is the rate performance rents are actually achieved in the environment. The delays, $\delta$ relate to the time it takes to enact aspirations, $\delta^{Enact} = \delta_{Transact}$, and report performance, $\delta^{Report} = \delta_{Perform}$, respectively. These delays in the process are a critical aspect of the system dynamics.

To complete the loop, a perceived gap (APvAG), $g^{Exploit}$, increases the level of TLA. The gap, $g^{Exploit}$, positively relates to the level of TLA, with a greater gap increasing TLA, but only to a point. This internal process of converting a recognized gap into leadership activity is based upon the interpretation of information returned to the system and the availability of skilled leaders in the right jobs. Thus, this function is likely to be quite complex. For simplicity, the effects of this interpretation and leadership development process are represented in the exemplary embodiment as a function that measures leadership development capacity, Development Capacity (DevCap) LQ3, that moderates the creation of Leadership Activity. This simplification is intended to approximate the process of leadership development. Without the LQ3 function (which would serve to moderate $L^{Transact}$), in the exemplary embodiment, the equation is as follows:

$$L_t^{Transact} = L_{t-1}^{Transact} + g_{t-1}^{Exploit} * (1 - L_{t-1}^{Transact}) - \xi^{Transact} * L_{t-1}^{Transact} \quad (0.22)$$

Where, $\xi^{Transact}$, refers to the rate at which the level of leadership activities, in this case transactional, declines in the organization if it is not reinforced, referred to above as Transacting Leadership Dissipation Rate (TLDR).

Once EA, $a^{Exploit}$, are set, enacting for the organization the APvAG (gap), $g^{Exploit}$, introduces a time delay $\delta_{Transact}$. Programs must be communicated and executed and information must flow through the organization to its members. Actual rents collected are compared with aspirations, but a reporting delay, $\delta_{Perform}$, must be managed. However, a low level of TLA, $L^{Transact}$, adds error into the implementation by understating the APvVAG in resource allocation decisions. The APvVAG (gap), $g^{Transact}$, influences the level of Investment in Exploitation (IIE) and eventually EAR, $r^{Exploit}$, versus other alternatives. The size of the perceived gap between the desired and current states of the organization drives the creation of TLA and routines.

The level of TLA is assumed to impact the dynamics of the organizational system by biasing it toward exploitation in two ways. (1) The level of TLA impacts the level of pressure placed on the organization to reduce the Nest Feathering (NF), $r^{Absorbed}$, and thus increase the slack rate SRa, $r^{Slack}$, and thus the level of slack resources, SRes, or $R^{Slack}$, available to the firm, and (2) the level of TLA impacts the Exploitation Allocation Rate (EAR), $r^{Exploit}$, and thus the level of exploitation resources (ER), $R^{Exploit}$, available to create Current Capabilities for Exploitation (CCE), $C^{Exploit}$.

A time delay is involved as the level of Transformational Leadership Activity (TrLA) builds. The intensity level impacts both the development of Transforming Aspirations (TA) and the Current State Versus Desired State Gap (CS-vDSG), and thus, Investment in Exploration (IIEx), Investment in Initiatives (III) and ultimately the Exploration Allocation Rate (ExAR). The length of delay, $\delta^{Transform}$, is a parameter that can be adjusted, but twelve (12) to twenty-four (24) months, would not be surprising, and even five (5) to ten (10) years might be required for significant transformation. In addition, in the exemplary embodiment, if the parameter called Pressure to Change (PTC) or $\rho_{Change}$ is greater than a particular threshold value, then the perceived addressable new market is assumed to be the driver of aspirations TA, that is, a new market is recognized and the need for change is assumed.

Post delay associated with exploration and new capabilities reporting (e.g., ExRD) $\delta_{Adapt}$, TA are set (or reset) based upon signals from the environment represented by Environmental State variables; these are moderated by (1) a Collective Cognitive function (CogCap) $LQ1 = c^{Transform}$ that interprets the signals, and (2) the level of TrLA, as described above. Signals from the environment, that is Environmental State variables that are used by the function, include the growth and competitive characteristics of New Market Carrying Capacity (NMCC).

The clarity of this signal is distorted for internal consumption by the Exploration Collective Cognitive Capacity factor (CogCap), $LQ1 = c^{Transform}$, that introduces error into the interpretation. Also, the level of the TrLA impacts the level of aspirations. Together, these limit the accuracy of predictions associated with TA.

In the exemplary embodiment, TA, $a^{Transform}$, are in dollars per unit of time and represent expectations for Rent From New Capabilities from Exploration (NCEx). These aspirations (TA) depend upon the perceived market size, NMCC, and in the case of transformation, the level of TrLA. The formula is as follows:

$$a_t^{Transform} = L^{Transform} * \hat{M}_t^{New}, \quad (0.23)$$

where $\hat{M}^{New}$ is a noisy view of new market size (i.e., NMCC) that includes the effects of function CogCap (LQ1).

One approach to determining $\hat{M}^{New}$ would be to assume the organization estimates new market size by determining the parameters of a logistics or "S-Curve" without regard for the current market size. That is, the organization bases its decisions from some "analysts' projections". In this case the function could be modeled, such that $$\hat{M}_t^{New} = c^{Transform} m / (1 + e^{d - (c^{Transform} * a t)}) \quad (0.24)$$

where $\hat{M}^{New}$ is the perceived NMCC function over time, and where m is the maximum level that the market is forecasted to reach at saturation and d and a are parameters which determine the "length" of the S-curve. The factor $c^{Transform}$ represents the LQ1 function and is a parameter representing the random error introduced by a particular organization's collective cognition (CogCap) as it interprets these market signals. This error approaches zero and $c^{Transform}$ approaches 1.

All of the above are parameters that can be varied in virtual experiments. In this exemplary embodiment, a simple function is defined where the size of the new markets is assumed to be equal to the current size of the new market less the share gained by competitors, and multiplied by a collective cognition factor, $c^{Transform}$, that is:

$$\hat{M}_t^{New} = c^{Transform} * M_t^{New} * (1 - M_t^{Competitors}) \quad (0.25)$$

Where $M_t^{Competitors} = \gamma_{New}$ is the portion of the market ceded to competition (e.g., New Market Competition (NMC)).

As described above, Exploration Resources (ExR) are used by the organization to build new capabilities over time. Thus, the value of new capabilities, in terms of dollars of potential, is a function of ExR. Once created, these new capabilities are presented to the marketplace and depending in the carrying capacity of the new markets they address (NMCC), find new opportunities and their match to market needs rents are collected for these new capabilities at the rate, $r^{Explore}$.

After a reporting delay, $\delta_{Adapt}$, newly collected Rent From New Capabilities from Exploration (RFNCEx) are compared with the organization's TA to refresh the CSvDSG (gap) enacted by TrLA. The level of this activity determines what new aspirations are established, and thus whether the gap persists. The higher the level of TrLA, the higher the bar is raised as success is achieved. This effect is moderated by a function representing Communication Skills, (ComSk), LQ2, which may reduce the perceived gap regardless of the actual gap. Thus, with little TrLA the TA is not increased to reset aspirations, and gap closure acts as a balancing feedback loop and as the gap closes reduces the level of exploration. The time delays associated with these various steps are critical here. Although simplified in the exemplary embodiment, other more comprehensive functions are meant to be included in the invention.

Once TA, $a^{Transform}$, are set, enacting TrLA to define for the organization the gap CSvDSG, $g^{Transform}$, which includes programs to close the gap, introduces a time delay, $\delta_{Transform}$. Programs must be communicated and executed and information must flow through the organization to its members. Actual rents collected are compared with aspirations, but an reporting delay must be managed. However, a low level of TrLA, $L^{Transform}$, adds error into the implementation by understating the CSvDSG in resource allocation decisions. The CSvDSG (gap), $g^{Transform}$, influences the level of ExAR, $r^{Explore}$ as described below, versus other alternatives. After time delays for reporting and enacting aspirations, the equation used in the exemplary embodiment is:

$$g_t^{Transform} = L^{Transform} * (a_{t-\delta^{enact}}^{Transform} - r_{t-\delta^{report}}^{Explore}) \quad (0.26)$$

Where g is the CSvDSG (gap), L the level of TrLA, a is the aspiration level r is the rate performance rents are extracted from the environment, and $\delta$'s represents enactment, $[\delta^{Enact}=\delta_{Transform}]$ and reporting delays, $[\delta^{Report}=\delta_{Adapt}]$, respectively. This internal assessment is based upon the interpretation of information returned to the system. Thus, this function is likely to be quite complex. For simplicity, the effects of this interpretation process are represented in the exemplary embodiment as a factor that measures Communications Skill (ComSk) LQ2, that moderates the understanding of the gap by the organization's members. This simplification is intended to approximate the process of communications and alignment.

As in the case of TLA, the size of the perceived gap between the desired and current states of the organization drives the creation of TrLA and routines. The greater the perceived gap, the more the vacuum for TrLA is filled by ambitious actors. This internal process of converting a recognized gap into leadership activity is based upon the interpretation of information returned to the system and the availability of skilled leaders in the right jobs. Thus, this function is likely to be quite complex. For simplicity, the effects of this interpretation and leadership development process are represented in the exemplary embodiment as a function that measures leadership Development Capacity (DevCap) LQ3, that moderates the creation of Leadership Activity. This simplification is intended to approximate the process of leadership development. For simplicity, ignoring the LQ3 function that moderates this process, the equation is:

$$L_t^{Transform} = \quad (0.27)$$

$$L_{t-1}^{Transform} + \frac{g_{t-\delta^{enact}}^{Transform}}{a_{t-\delta^{enact}}^{Transform}} * (1 - L_{t-\delta^{enact}}^{Transform}) - \xi^{Transact} * L_{t-1}^{Transform}$$

The level of TrLA is assumed to impact the dynamics of the organizational system by biasing it toward exploration. This occurs through two channels, (1) continuous investment in exploration (through programs such as, but not limited to, R&D and other learning programs), and (2) through focused investment in strategic initiatives intended to build new capabilities. This internal process of converting leadership activity into investment in exploration and innovation initiatives is based upon the interpretation of information returned to the system and the availability of skilled leaders in the right jobs. Thus, this function is likely to be quite complex. For simplicity, the effects of this interpretation balancing investment and risk are represented in the exemplary embodiment as a factor that measures decision quality and execution proficiency. This highly complex, collective decision making process is summarized in the preferred embodiment as a function called Risk Aversion (RskAv) LQ4, that moderates the allocation of resources to exploration and new capabilities development. This simplification is intended to approximate the process of decision-making and execution in the resource allocation and implementation processes.

Investment in non-specific exploration has the characteristics of real options whereby the idea is to invest just enough to "keep the option open." Investment in strategic initiatives is more like investment in assets or capital and likely to be judged with standard business cases and discounted cash flows. Both of these investment types are seen as biasing the system toward an increased ExAR, $r^{Explore}$. Ignoring the RskAv function which is assumed in the exemplary embodiment to be a factor reducing the value of $r^{Explore}$, the equation is:

$$r^{Explore} = L_{t-\delta}^{Transform} * i^{R\&D} + i^{initiatives} \quad (0.28)$$

where $i^{R\&D} = i^{Explore}$ is the exploration factor, Investment in Exploration (IIEx), and $i^{Initiatives}$ represents investments in focused initiatives to build new capabilities, Investment in Initiatives (III). In the exemplary embodiment, the factor $i^{initiatives}$ is assumed to equal a particular value, the standard intervention, but only if TrLA is above a certain threshold level and there are adequate Slack Resources (SRes) to enable investment, otherwise the investment is zero (0). Finally, there exists a function that is represented by the variable Balance Exploitation and Exploration (BEEx), $\epsilon$, that describes the mutual impact of any interaction between TLA and TrLA, such that: $TrLA = f(TLA, \epsilon)$.

Having described the process wherein transformational leadership activities arise, and then bias the resource allocation in the system toward exploration, the system description is complete. Both transactional and transformational leadership activities (TLA, TrLA) arise from the dynamics of the system, are measured by defined variables, and if each is reinforced by internal system processes (which respond to information signals from the environment), each operates to bias the manner in which system responds to the environment, either through increased focus on exploitation and performance or exploration and adaptation, or both. These effects are seen in the variables that define the Organization State, the Environment State and Leadership Activities.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A computer-implemented method for implementing a dynamic leadership simulation, the method comprising:
   gathering data on at least one organization state variable via a computer system;
   gathering data on at least one leadership activities variable via the computer system, wherein the at least one leadership activities variable correlates to at least one of a human behavior pattern or a communication strategy associated with at least one individual in an organization;
   determining by utilizing instructions that are executed by a processor a level of leadership activity across the organization for the at least one leadership activities variable based at least in part on aggregating the data gathered on the at least one leadership activities variable;
   calculating a performance of the organization based on the at least one organization state variable, the at least one leadership activities variable, and the determined level of leadership activity via the computer system, wherein the calculated performance of the organization is utilized in determining a plurality of actions to be executed to adjust the performance of the organization; and
   adjusting the plurality of actions to be executed to adjust the performance of the organization as the data on the at least one organization state variable and the at least one leadership activities variable change over time.

2. The method of claim 1, comprising the further step of:
   gathering data on at least one environment state variable, said at least one environment state variable being used in conjunction with the organization state and leadership activities variables to calculate the performance of the organization.

3. The method of claim 1, wherein the performance of the organization is determined by calculating total performance rents collected.

4. The method of claim 1, wherein the performance of the organization is determined by calculating resources available to the organization.

5. The method of claim 1, wherein the at least one organization state variable comprises one or more variables selected from the following:
   total performance rent collected, return rate, resources available to the firm, required for operations, current capabilities for exploitation, nest feathering, slack resources, slack rate, exploitation allocation rate, exploitation resources, exploitation capabilities creation rate, exploitation capabilities dissipation rate, resent from current capabilities for exploitation, performance reporting delay, exploration allocation rate, exploration resources, exploration capabilities creation rate, new capabilities from exploration, exploration capabilities dissipation rate, rent from new capabilities for exploration, explore reporting delay, time delay new capability development, and time delay exploitation capability development.

6. The method of claim 1, wherein the at least one leadership activities variable comprises one or more variables selected from the following:
   transaction leadership activity, transacting leadership creation rate, time delay to enact transacting leadership, transacting leadership dissipation rate, exploitation aspirations, actual performance versus aspiration gap, transformation leadership activity, transformation leadership creation rate, time delay to enact transformation leadership, transformation leadership dissipation rate, transforming aspirations, current state versus desired state gap, explore rents with reporting delay, performance reporting delay, cognitive capacity, communication skill, development capacity, risk aversion, pressure to perform, pressure to change, transaction leadership efficiency pressure, investment in exploitation, investment in exploration, investment in initiatives, and balance exploitation and exploration.

7. The method of claim 2, wherein the at least one environment state variable comprises one or more variables selected from the following:
   old market carrying capacity, disappearing old markets, old market competition, new market carrying capacity, growth in new markets, and new market competition.

8. The method of claim 1, comprising the further step of:
   storing the organization state, environment state, and leadership activities variables as at least one time series matrix.

9. The method of claim 8, wherein the performance of the organization is calculated by processing the at least one time series matrix.

10. The method of claim 1, comprising the further step of: generating at least one report on the calculated performance of the organization.

11. The method of claim 10, comprising the further step of: analyzing the at least one report.

12. The method of claim 1, wherein the step of gathering data on at least one organization state variable comprises modeling the at least one organization state variable using a computer modeling program.

13. The method of claim 1, wherein the step of gathering data on at least one organization state variable comprises gathering data based on the activities of an existing organization.

14. The method of claim 1, wherein the step of gathering data on at least one leadership activities variable comprises modeling the at least one leadership activities variable using a computer modeling program.

15. The method of claim 1, wherein the step of gathering data on at least one leadership activities variable comprises gathering data based on the activities of an existing organization.

16. The method of claim 2, wherein the step of gathering data on at least one environment state variable comprises modeling the at least one environment state variable using a computer modeling program.

17. The method of claim 2, wherein the step of gathering data on at least one environment state variable comprises gathering data based on the activities of an existing organization.

18. The method of claim 11, comprising the further step of:
   implementing at least one protocol for the organization based on the results of the at least one report.

19. The method of claim 1, wherein the at least one organization state variable comprises an organization state of at least one computer system.

20. The method of claim 1, wherein the at least one organization state variable comprises an organization state of at least one business entity.

21. A computer system comprising:
   at least one computer, wherein the at least one computer includes at least one program stored therein, said program performing the steps of:
   accepting data on at least one organization state variable;

accepting data on at least one leadership activities variable, wherein the at least one leadership activities variable correlates to at least one of a human behavior pattern or a communication strategy associated with at least one individual in an organization;

determining a level of leadership activity across the organization for the at least one leadership activities variable based at least in part on aggregating the data gathered on the at least one leadership activities variable;

calculating a performance of the organization based on the at least one organization state variable, the leadership activities variable, and the determined level of leadership activity, wherein the calculated performance of the organization is utilized in determining a plurality of actions to be executed to adjust the performance of the organization; and adjusting the plurality of actions to be executed to adjust the performance of the organization as the data on the at least one organization state variable and the at least one leadership activities variable change over time.

22. The computer system of claim 21, the program performs the additional step of:

accepting data on at least one environment state variable, wherein the performance of the organization is calculated based on the organization state, environment state and leadership activities variables.

23. A non-transitory computer readable medium having embodied thereon a computer program, which when loaded in and executed by a computer, causes the computer to:

accept data on at least one organization state variable;

accept data on at least one leadership activities variable, wherein the at least one leadership activities variable correlates to at least one of a human behavior pattern or a communication strategy associated with at least one individual in an organization;

determining a level of leadership activity across the organization for the at least one leadership activities variable based at least in part on aggregating the data gathered on the at least one leadership activities variable;

calculate a performance of the organization based on the at least one organization state variable, the at least one leadership activities variable, and the determined level of leadership activity, wherein the calculated performance of the organization is utilized in determining a plurality of actions to be executed to adjust the performance of the organization; and adjusting the plurality of actions to be executed to adjust the performance of the organization as the data on the at least one organization state variable and the at least one leadership activities variable change over time.

24. The computer readable medium of claim 23, further causing the computer to:

accept data on at least one environment state variable, wherein the performance of the organization is calculated based on the organization state, environment state and leadership activities variables.

25. A non-transitory computer readable medium comprising computer instructions, which when loaded and executed by a processor, cause the processor to:

accept data on at least one organization state variable;

accept data on at least one leadership activities variable, wherein the at least one leadership activities variables correlates to a human relations factor associated with at least one individual in an organization;

determining a level of leadership activity across the organization for the at least one leadership activities variable based at least in part on aggregating the data gathered on the at least one leadership activities variable;

organize the at least one organization state variable and the at least one leadership activities variable as a time series matrix;

calculate a performance of the organization based on the at least one organization state variable, the leadership activities variable, and the determined level of leadership activity, wherein the performance of the organization is calculated by processing the time series matrix;

generate at least one report on the calculated performance of the organization;

implement at least one protocol for adjusting the performance of the organization, wherein the at least one protocol is based on the at least one report.

26. The computer readable medium of claim 25, further causing the processor to:

accept data on at least one environment state variable, wherein the performance of the organization is calculated based on the organization state, environment state and leadership activities variables.

27. A computer-implemented method for implementing a leadership simulation, the method comprising:

generating at least one organization state variable;

generating at least one leadership activities variable via a computer system, wherein the at least one leadership activities variables correlates to a human relations factor associated with at least one individual in an organization;

determining a level of leadership activity across the organization for the at least one leadership activities variable based at least in part on aggregating the data gathered on the at least one leadership activities variable;

calculating a performance of the organization based on the at least one organization state variable, environment state, the at least one leadership activities variable, and the determined level of leadership activity, via the computer system, wherein the calculated performance of the organization is utilized in determining a plurality of actions to be executed to adjust the performance of the organization.

28. The method of claim 27, further comprising:

generating at least one environment state variable, said at least one environment state variable being used in conjunction with the organization state and leadership activities variables to calculate the performance of the organization.

* * * * *